US012794741B2

(12) United States Patent
Pan et al.

(10) Patent No.: US 12,794,741 B2
(45) Date of Patent: Nov. 10, 2026

(54) SIGNAL SENDING METHOD AND COMMUNICATION APPARATUS

(71) Applicant: HUAWEI TECHNOLOGIES CO., LTD., Shenzhen (CN)

(72) Inventors: Ju Yan Pan, Singapore (SG); Yifei Yang, Singapore (SG); Qian Yu, Singapore (SG); Changzheng Ma, Singapore (SG); Zhongjun Wang, Singapore (SG); Lee Guek Doreen Yeo, Singapore (SG)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 79 days.

(21) Appl. No.: 18/915,331

(22) Filed: Oct. 14, 2024

(65) Prior Publication Data

US 2025/0039021 A1 Jan. 30, 2025

Related U.S. Application Data

(63) Continuation of application No. PCT/CN2022/114049, filed on Aug. 22, 2022.

(30) Foreign Application Priority Data

Apr. 22, 2022 (CN) ......................... 202210431063.7

(51) Int. Cl.
*H04L 25/03* (2006.01)
*H04J 13/10* (2011.01)
*H04L 25/02* (2006.01)

(52) U.S. Cl.
CPC ........ *H04L 25/03178* (2013.01); *H04J 13/10* (2013.01); *H04L 25/0212* (2013.01)

(58) Field of Classification Search
CPC ............ H04B 1/7163; H04L 25/03178; H04L 25/0212; G01S 7/0234; G01S 13/0209; G01S 13/76; H04J 13/10; H04J 13/102
See application file for complete search history.

(56) References Cited

U.S. PATENT DOCUMENTS 8,885,669 B2 11/2014 Zhang et al.
11,184,153 B2 * 11/2021 Hammerschmidt .. G01S 5/0072
(Continued)

FOREIGN PATENT DOCUMENTS

CN 103609047 A 2/2014

OTHER PUBLICATIONS

Doc.: IEEE 802.15-05-0231-03-004a, "Impulse Radio Signaling for Communication and Ranging", Francois Chin, Lei Zhongding, Yuen-Sam Kwok, Xiaoming Peng, May 12, 2005, XP017670403, total 47 pages.
(Continued)

*Primary Examiner* — Dac V Ha

(57) ABSTRACT

In a method for sending signals in network communications, an apparatus obtains a plurality of extended sequences, with each extended sequence comprising an original sequence and an additional sequence. In each extended sequence, the additional sequence is located before the original sequence, and the additional sequence includes last m codes of the original sequence. Alternatively, the additional sequence is located after the original sequence, and the additional sequence includes first n codes of the original sequence. The apparatus generates a plurality of target sequences based on the plurality of extended sequences and a security code corresponding to each extended sequence. The apparatus then generates a first impulse signal based on the plurality of target sequences, and sending the first impulse signal.

20 Claims, 11 Drawing Sheets

(56) References Cited

U.S. PATENT DOCUMENTS

| | | | | |
|---|---|---|---|---|
| 12,432,098 | B2 * | 9/2025 | Niewczas | H04L 25/0224 |
| 2020/0336303 | A1 | 10/2020 | Sierra et al. | |
| 2025/0141852 | A1 * | 5/2025 | Ma | H04L 63/0435 |

OTHER PUBLICATIONS

P802.15.4z/D05,“Draft Standard for Low-Rate Wireless Networks”—Amendment:Enhanced Ultra Wide-Band (UWB) Physical Layers (PHYs) and Associated Ranging Techniques.Nov. 2019,total 180 pages.

802.15.4™—2015,“IEEE Standard for Low-Rate Wireless Personal Area Networks (WPANs)”,2015,total 709 pages.

* cited by examiner

SIGNAL SENDING METHOD AND COMMUNICATION APPARATUS

CROSS-REFERENCE TO RELATED APPLICATIONS

This application is a continuation of International Application PCT/CN2022/114049, filed on Aug. 22, 2022, which claims priority to Chinese Patent Application 202210431063.7, filed on Apr. 22, 2022. The disclosures of the aforementioned applications are hereby incorporated by reference in their entirety.

TECHNICAL FIELD

This application relates to the field of communication technologies, and in particular, to a signal sending method and a communication apparatus.

BACKGROUND

Currently, in an impulse radio ultra-wideband (IR-UWB) system, during ranging or positioning via an impulse signal, an impulse radio transmitter may perform security processing on the impulse signal via a security code, and send an impulse signal obtained through security processing to an impulse radio receiver. The impulse radio receiver may receive impulse signals transmitted over a plurality of paths, separately perform correlation processing on the received impulse signals and the predetermined impulse signal that is sent by the impulse radio transmitter and that is obtained through security processing, and further determine accurate receiving time based on a correlation processing result. The receiving time is time at which the impulse radio receiver receives the impulse signal transmitted in a straight line between the impulse radio transmitter and the impulse radio receiver. Therefore, subsequent ranging or positioning and calculation may be further performed based on the receiving time. The impulse signal before security processing includes at least one preamble code, and the impulse signal before security processing and the impulse signal obtained through security processing are signals known to both the impulse radio transmitter and the impulse radio receiver.

In the foregoing method, because security processing is performed on the impulse signal via the security code, interference may occur between preamble codes in the impulse signal, orthogonality of the preamble codes is reduced, and accuracy of a subsequent processing process is affected.

SUMMARY

The embodiments provide a signal sending method and a communication apparatus, to reduce interference between sequences in a sent signal, improve orthogonality of the sequences, and improve accuracy of a subsequent processing process.

According to a first aspect, the embodiments provide a signal sending method, applied to a first communication apparatus. The method includes: obtaining a plurality of extended sequences, where each of the plurality of extended sequences includes an original sequence and an additional sequence, the original sequence in each extended sequence includes N codes, and N is a positive integer; and the original sequence and the additional sequence in each extended sequence meet the following conditions: the additional sequence is located before the original sequence, and the additional sequence includes last m codes of the original sequence, where m is a positive integer less than or equal to N; or the additional sequence is located after the original sequence, and the additional sequence includes first n codes of the original sequence, where n is a positive integer less than or equal to N; generating a plurality of target sequences based on the plurality of extended sequences and a security code corresponding to each of the plurality of extended sequences, where the plurality of target sequences include a target sequence corresponding to each extended sequence, and the target sequence corresponding to each extended sequence is generated based on each extended sequence and the security code corresponding to each extended sequence; and generating a first impulse signal based on the plurality of target sequences, and sending the first impulse signal.

In the method, the additional sequence in each of the plurality of extended sequences is a cyclic redundancy (cyclic prefix/cyclic suffix) of the original sequence in the extended sequence, and the impulse signal sent by the first communication apparatus is obtained based on the plurality of extended sequences on which security processing is performed. In this manner, existence of the additional sequence increases orthogonality between original sequences on which security processing is performed. Therefore, a signal that carries information about the original sequence is sent by using the method, to reduce interference between the original sequences, improve orthogonality of the original sequences, and improve accuracy of a subsequent processing result. The method may be applied to an IR-UWB ranging or positioning process. The original sequence may be a preamble code. According to the method, interference between preamble codes in a signal sent by a transmitter can be reduced, and orthogonality of the preamble codes can be improved. Further, this can improve accuracy of a result of correlation processing performed by a receiver, improve accuracy of time estimation performed by the receiver based on a correlation processing result, and further improve accuracy of ranging or positioning.

In a possible implementation, a value of m is equal to a value of N, or a value of m is a quarter of a value of N, or a value of m is a half of a value of N.

In a possible implementation, a value of n is equal to the value of N, or a value of n is a quarter of the value of N, or a value of n is a half of the value of N.

In the foregoing method, when a length of the additional sequence is a quarter or a half of a length of the original sequence, orthogonality of the original sequences can be improved while a small quantity of additional resources is used. When the length of the additional sequence is equal to the length of the original sequence, orthogonality of the original sequences can be ensured, and any interference between the original sequences can be reduced to a maximum extent, to obtain optimal effect.

In a possible implementation, the plurality of extended sequences include a first extended sequence and a second extended sequence. The additional sequence in the first extended sequence is located before the original sequence in the first extended sequence, and the additional sequence in the second extended sequence is located before the original sequence in the second extended sequence; or the additional sequence in the first extended sequence is located after the original sequence in the first extended sequence, and the additional sequence in the second extended sequence is located before the original sequence in the second extended sequence; or the additional sequence in the first extended sequence is located before the original sequence in the first extended sequence, and the additional sequence in the second extended sequence is located after the original sequence in the second extended sequence.

In the method, the additional sequence in the extended sequence may be a cyclic prefix of the original sequence, or a cyclic suffix of the original sequence. Therefore, flexibility is high.

In a possible implementation, a value of each code in the original sequence in each extended sequence is any one of the following values: −1, 0, and +1.

In a possible implementation, a value of the security code corresponding to each extended sequence is any one of the following values: −1, 0, and +1.

In the method, the first communication apparatus randomly selects a security code, so that a security code that needs to be used can be quickly selected. Therefore, processing efficiency is high.

In a possible implementation, the generating a plurality of target sequences based on the plurality of extended sequences and a security code corresponding to each of the plurality of extended sequences includes: multiplying a code included in each extended sequence by a corresponding security code, to obtain the target sequence corresponding to each extended sequence.

In the method, the first communication apparatus can implement effect of performing security processing on different extended sequences via different security codes, and can ensure high security.

According to a second aspect, the embodiments provide a signal processing method, applied to a second communication apparatus. The method includes: receiving at least one impulse signal from a first communication apparatus, where the at least one impulse signal is a signal received by the second communication apparatus when a first impulse signal sent by the first communication apparatus is transmitted to the second communication apparatus over at least one transmission path; and determining at least one first sequence corresponding to the at least one impulse signal, where the at least one first sequence includes a first sequence corresponding to each of the at least one impulse signal, each of the at least one first sequence includes a plurality of second sequences, in the plurality of second sequences, each second sequence includes a first target sequence and a first additional sequence, the first target sequence in each second sequence includes P codes, and P is a positive integer; and the first target sequence and the first additional sequence in each second sequence meet the following conditions: the first additional sequence is located before the first target sequence, and the first additional sequence includes last p codes of the first target sequence, where p is a positive integer less than or equal to P; or the first additional sequence is located after the first target sequence, and the first additional sequence includes first q codes of the first target sequence, where q is a positive integer less than or equal to P; obtaining a third sequence, where the third sequence includes the first target sequence included in each second sequence in any first sequence; determining at least one correlation value, and selecting a target impulse signal from the at least one impulse signal based on the at least one correlation value, where the at least one correlation value includes a correlation value between each of the at least one first sequence and the third sequence; and using time at which the target impulse signal is received as time at which the first impulse signal sent by the first communication apparatus is received.

In the method, the second communication apparatus is used as a receiver, the first sequence corresponding to the signal received by the second communication apparatus includes the plurality of second sequences, and each second sequence includes the first target sequence and a cyclic prefix/cyclic suffix, namely, the first additional sequence, corresponding to the first target sequence. Existence of the cyclic prefix/cyclic suffix can reduce interference between the first target sequence and other sequences in the second sequence, and improve orthogonality between the sequences. In view of this, when the second communication apparatus performs correlation processing on the first sequence corresponding to the received signal and the third sequence, interference between subsequences in the sequence can be avoided as much as possible, and codes used for correlation calculation of adjacent subsequences can be prevented from being overlapped. Therefore, this can improve accuracy of correlation calculation. The method may be applied to an IR-UWB ranging or positioning process, to improve accuracy of time estimation performed by the receiver based on a correlation processing result, and further improve accuracy of ranging or positioning.

In a possible implementation, the plurality of second sequences are generated based on a plurality of extended sequences and a security code corresponding to each of the plurality of extended sequences. The plurality of second sequences include a second sequence corresponding to each of the plurality of extended sequences, and the second sequence corresponding to each extended sequence is generated based on each extended sequence and the security code corresponding to each extended sequence. In the plurality of extended sequences, each extended sequence includes an original sequence and an additional sequence, the original sequence in each extended sequence includes N codes, and N is a positive integer. The original sequence and the additional sequence in each extended sequence meet the following conditions: the additional sequence is located before the original sequence, and the additional sequence includes last m codes of the original sequence, where m is a positive integer less than or equal to N; or the additional sequence is located after the original sequence, and the additional sequence includes first n codes of the original sequence, where n is a positive integer less than or equal to N.

In a possible implementation, a quantity of codes of the original sequence included in the extended sequence corresponding to each second sequence is equal to a quantity of codes of a first target sequence included in the second sequence. A quantity of codes of the additional sequence included in the extended sequence corresponding to each second sequence is equal to a quantity of codes of a first additional sequence included in the second sequence.

In a possible implementation, a value of m is equal to a value of N, or a value of m is a quarter of a value of N, or a value of m is a half of a value of N.

In a possible implementation, a value of n is equal to the value of N, or a value of n is a quarter of the value of N, or a value of n is a half of the value of N.

In a possible implementation, in the plurality of extended sequences, a value of each code in the original sequence included in each extended sequence is any one of the following values: −1, 0, and +1.

In a possible implementation, a value of the security code corresponding to each of the plurality of extended sequences is any one of the following values: −1, 0, and +1.

In a possible implementation, a value of p is equal to a value of P, or a value of p is a quarter of the value of N, or a value of p is a half of a value of P.

In a possible implementation, a value of q is equal to the value of P, or a value of q is a quarter of the value of N, or a value of q is a half of the value of P.

In a possible implementation, in the plurality of second sequences, a value of each code in the first target sequence included in each second sequence is any one of the following values: −1, 0, and +1.

According to a third aspect, the embodiments provide a communication apparatus. The communication apparatus includes a transceiver unit and a processing unit. The processing unit is configured to: obtain a plurality of extended sequences, where each of the plurality of extended sequences includes an original sequence and an additional sequence, the original sequence in each extended sequence includes N codes, and N is a positive integer; and the original sequence and the additional sequence in each extended sequence meet the following conditions: the additional sequence is located before the original sequence, and the additional sequence includes last m codes of the original sequence, where m is a positive integer less than or equal to N; or the additional sequence is located after the original sequence, and the additional sequence includes first n codes of the original sequence, where n is a positive integer less than or equal to N; generate a plurality of target sequences based on the plurality of extended sequences and a security code corresponding to each of the plurality of extended sequences, where the plurality of target sequences include a target sequence corresponding to each extended sequence, and the target sequence corresponding to each extended sequence is generated based on each extended sequence and the security code corresponding to each extended sequence; and generate a first impulse signal based on the plurality of target sequences, and send the first impulse signal by using the transceiver unit.

In a possible implementation, a value of m is equal to a value of N, or a value of m is a quarter of a value of N, or a value of m is a half of a value of N.

In a possible implementation, a value of n is equal to the value of N, or a value of n is a quarter of the value of N, or a value of n is a half of the value of N.

In a possible implementation, the plurality of extended sequences include a first extended sequence and a second extended sequence. The additional sequence in the first extended sequence is located before the original sequence in the first extended sequence, and the additional sequence in the second extended sequence is located before the original sequence in the second extended sequence; or the additional sequence in the first extended sequence is located after the original sequence in the first extended sequence, and the additional sequence in the second extended sequence is located before the original sequence in the second extended sequence; or the additional sequence in the first extended sequence is located before the original sequence in the first extended sequence, and the additional sequence in the second extended sequence is located after the original sequence in the second extended sequence.

In a possible implementation, a value of each code in the original sequence in each extended sequence is any one of the following values: −1, 0, and +1.

In a possible implementation, a value of the security code corresponding to each extended sequence is any one of the following values: −1, 0, and +1.

In a possible implementation, when generating the plurality of target sequences based on the plurality of extended sequences and the security code corresponding to each of the plurality of extended sequences, the processing unit is specifically configured to multiply a code included in each extended sequence by a corresponding security code, to obtain the target sequence corresponding to each extended sequence.

According to a fourth aspect, the embodiments provide a communication apparatus. The communication apparatus includes a transceiver unit and a processing unit. The transceiver unit is configured to receive at least one impulse signal from a first communication apparatus, where the at least one impulse signal is a signal received by the second communication apparatus when a first impulse signal sent by the first communication apparatus is transmitted to the second communication apparatus over at least one transmission path. The processing unit is configured to: determine at least one first sequence corresponding to the at least one impulse signal, where the at least one first sequence includes a first sequence corresponding to each of the at least one impulse signal, each of the at least one first sequence includes a plurality of second sequences, in the plurality of second sequences, each second sequence includes a first target sequence and a first additional sequence, the first target sequence in each second sequence includes P codes, and P is a positive integer; and the first target sequence and the first additional sequence in each second sequence meet the following conditions: the first additional sequence is located before the first target sequence, and the first additional sequence includes last p codes of the first target sequence, where p is a positive integer less than or equal to P; or the first additional sequence is located after the first target sequence, and the first additional sequence includes first q codes of the first target sequence, where q is a positive integer less than or equal to P; obtain a third sequence, where the third sequence includes the first target sequence included in each second sequence in any first sequence; determine at least one correlation value, and selecting a target impulse signal from the at least one impulse signal based on the at least one correlation value, where the at least one correlation value includes a correlation value between each of the at least one first sequence and the third sequence; and use time at which the target impulse signal is received as time at which the first impulse signal sent by the first communication apparatus is received.

In a possible implementation, the plurality of second sequences are generated based on a plurality of extended sequences and a security code corresponding to each of the plurality of extended sequences. The plurality of second sequences include a second sequence corresponding to each of the plurality of extended sequences, and the second sequence corresponding to each extended sequence is generated based on each extended sequence and the security code corresponding to each extended sequence. In the plurality of extended sequences, each extended sequence includes an original sequence and an additional sequence, the original sequence in each extended sequence includes N codes, and N is a positive integer. The original sequence and the additional sequence in each extended sequence meet the following conditions: the additional sequence is located before the original sequence, and the additional sequence includes last m codes of the original sequence, where m is a positive integer less than or equal to N; or the additional sequence is located after the original sequence, and the additional sequence includes first n codes of the original sequence, where n is a positive integer less than or equal to N.

In a possible implementation, a quantity of codes of the original sequence included in the extended sequence corresponding to each second sequence is equal to a quantity of codes of a first target sequence included in the second sequence. A quantity of codes of the additional sequence included in the extended sequence corresponding to each second sequence is equal to a quantity of codes of a first additional sequence included in the second sequence.

In a possible implementation, a value of m is equal to a value of N, or a value of m is a quarter of a value of N, or a value of m is a half of a value of N.

In a possible implementation, a value of n is equal to the value of N, or a value of n is a quarter of the value of N, or a value of n is a half of the value of N.

In a possible implementation, in the plurality of extended sequences, a value of each code in the original sequence included in each extended sequence is any one of the following values: −1, 0, and +1.

In a possible implementation, a value of the security code corresponding to each of the plurality of extended sequences is any one of the following values: −1, 0, and +1.

In a possible implementation, a value of p is equal to a value of P, or a value of p is a quarter of the value of N, or a value of p is a half of a value of P.

In a possible implementation, a value of q is equal to the value of P, or a value of q is a quarter of the value of N, or a value of q is a half of the value of P.

In a possible implementation, in the plurality of second sequences, a value of each code in the first target sequence included in each second sequence is any one of the following values: −1, 0, and +1.

According to a fifth aspect, the embodiments provide a communication apparatus. The communication apparatus includes a transceiver and a processor. The processor is configured to: obtain a plurality of extended sequences, where each of the plurality of extended sequences includes an original sequence and an additional sequence, the original sequence in each extended sequence includes N codes, and N is a positive integer; and the original sequence and the additional sequence in each extended sequence meet the following conditions: the additional sequence is located before the original sequence, and the additional sequence includes last m codes of the original sequence, where m is a positive integer less than or equal to N; or the additional sequence is located after the original sequence, and the additional sequence includes first n codes of the original sequence, where n is a positive integer less than or equal to N; generate a plurality of target sequences based on the plurality of extended sequences and a security code corresponding to each of the plurality of extended sequences, where the plurality of target sequences include a target sequence corresponding to each extended sequence, and the target sequence corresponding to each extended sequence is generated based on each extended sequence and the security code corresponding to each extended sequence; and generate a first impulse signal based on the plurality of target sequences, and send the first impulse signal by using the transceiver.

In a possible implementation, a value of m is equal to a value of N, or a value of m is a quarter of a value of N, or a value of m is a half of a value of N.

In a possible implementation, a value of n is equal to the value of N, or a value of n is a quarter of the value of N, or a value of n is a half of the value of N.

In a possible implementation, the plurality of extended sequences include a first extended sequence and a second extended sequence. The additional sequence in the first extended sequence is located before the original sequence in the first extended sequence, and the additional sequence in the second extended sequence is located before the original sequence in the second extended sequence; or the additional sequence in the first extended sequence is located after the original sequence in the first extended sequence, and the additional sequence in the second extended sequence is located before the original sequence in the second extended sequence; or the additional sequence in the first extended sequence is located before the original sequence in the first extended sequence, and the additional sequence in the second extended sequence is located after the original sequence in the second extended sequence.

In a possible implementation, a value of each code in the original sequence in each extended sequence is any one of the following values: −1, 0, and +1.

In a possible implementation, a value of the security code corresponding to each extended sequence is any one of the following values: −1, 0, and +1.

In a possible implementation, when generating the plurality of target sequences based on the plurality of extended sequences and the security code corresponding to each of the plurality of extended sequences, the processor is specifically configured to multiply a code included in each extended sequence by a corresponding security code, to obtain the target sequence corresponding to each extended sequence.

According to a sixth aspect, the embodiments provide a communication apparatus. The communication apparatus includes a transceiver and a processor. The transceiver is configured to receive at least one impulse signal from a first communication apparatus, where the at least one impulse signal is a signal received by the second communication apparatus when a first impulse signal sent by the first communication apparatus is transmitted to the second communication apparatus over at least one transmission path. The processor is configured to: determine at least one first sequence corresponding to the at least one impulse signal, where the at least one first sequence includes a first sequence corresponding to each of the at least one impulse signal, each of the at least one first sequence includes a plurality of second sequences, in the plurality of second sequences, each second sequence includes a first target sequence and a first additional sequence, the first target sequence in each second sequence includes P codes, and P is a positive integer; and the first target sequence and the first additional sequence in each second sequence meet the following conditions: the first additional sequence is located before the first target sequence, and the first additional sequence includes last p codes of the first target sequence, where p is a positive integer less than or equal to P; or the first additional sequence is located after the first target sequence, and the first additional sequence includes first q codes of the first target sequence, where q is a positive integer less than or equal to P; obtain a third sequence, where the third sequence includes the first target sequence included in each second sequence in any first sequence; determine at least one correlation value, and select a target impulse signal from the at least one impulse signal based on the at least one correlation value, where the at least one correlation value includes a correlation value between each of the at least one first sequence and the third sequence; and use time at which the target impulse signal is received as time at which the first impulse signal sent by the first communication apparatus is received.

In a possible implementation, the plurality of second sequences are generated based on a plurality of extended sequences and a security code corresponding to each of the plurality of extended sequences. The plurality of second sequences include a second sequence corresponding to each of the plurality of extended sequences, and the second sequence corresponding to each extended sequence is generated based on each extended sequence and the security code corresponding to each extended sequence. In the plurality of extended sequences, each extended sequence includes an original sequence and an additional sequence, the original sequence in each extended sequence includes N codes, and N is a positive integer. The original sequence and the additional sequence in each extended sequence meet the following conditions: the additional sequence is located before the original sequence, and the additional sequence includes last m codes of the original sequence, where m is a positive integer less than or equal to N; or the additional sequence is located after the original sequence, and the additional sequence includes first n codes of the original sequence, where n is a positive integer less than or equal to N.

In a possible implementation, a quantity of codes of the original sequence included in the extended sequence corresponding to each second sequence is equal to a quantity of codes of a first target sequence included in the second sequence. A quantity of codes of the additional sequence included in the extended sequence corresponding to each second sequence is equal to a quantity of codes of a first additional sequence included in the second sequence.

In a possible implementation, a value of m is equal to a value of N, or a value of m is a quarter of a value of N, or a value of m is a half of a value of N.

In a possible implementation, a value of n is equal to the value of N, or a value of n is a quarter of the value of N, or a value of n is a half of the value of N.

In a possible implementation, in the plurality of extended sequences, a value of each code in the original sequence included in each extended sequence is any one of the following values: −1, 0, and +1.

In a possible implementation, a value of the security code corresponding to each of the plurality of extended sequences is any one of the following values: −1, 0, and +1.

In a possible implementation, a value of p is equal to a value of P, or a value of p is a quarter of the value of N, or a value of p is a half of a value of P.

In a possible implementation, a value of q is equal to the value of P, or a value of q is a quarter of the value of N, or a value of q is a half of the value of P.

In a possible implementation, in the plurality of second sequences, a value of each code in the first target sequence included in each second sequence is any one of the following values: −1, 0, and +1.

According to a seventh aspect, the embodiments provide a computer-readable storage medium. The computer-readable storage medium stores a computer-readable program, and when the computer-readable program is run on a computer, the computer is enabled to perform the method described in the first aspect or any possible implementation of the first aspect or the method described in the second aspect or any possible implementation of the second aspect.

According to an eighth aspect, the embodiments provide a computer program product. When the computer program product runs on a computer, the computer is enabled to perform the method described in the first aspect or any possible implementation of the first aspect or the method described in the second aspect or any possible implementation of the second aspect.

According to a ninth aspect, the embodiments provide a chip. The chip is configured to read a computer program stored in a memory, to perform the method described in the first aspect or any possible implementation of the first aspect or the method described in the second aspect or any possible implementation of the second aspect.

According to a tenth aspect, some embodiments of this application provide a chip system. The chip system includes a processor, configured to support a computer apparatus in implementing the method described in the first aspect or any possible implementation of the first aspect or the method described in the second aspect or any possible implementation of the second aspect.

In a possible implementation, the chip system further includes a memory, and the memory is configured to store a program and data that are necessary for the computer apparatus.

In a possible implementation, the chip system includes a chip, or includes a chip and another discrete component.

For beneficial effect of the third aspect to the tenth aspect, refer to descriptions about the beneficial effect of the first aspect or the second aspect. Details are not described herein again.

DESCRIPTION OF EMBODIMENTS

Figure 1:
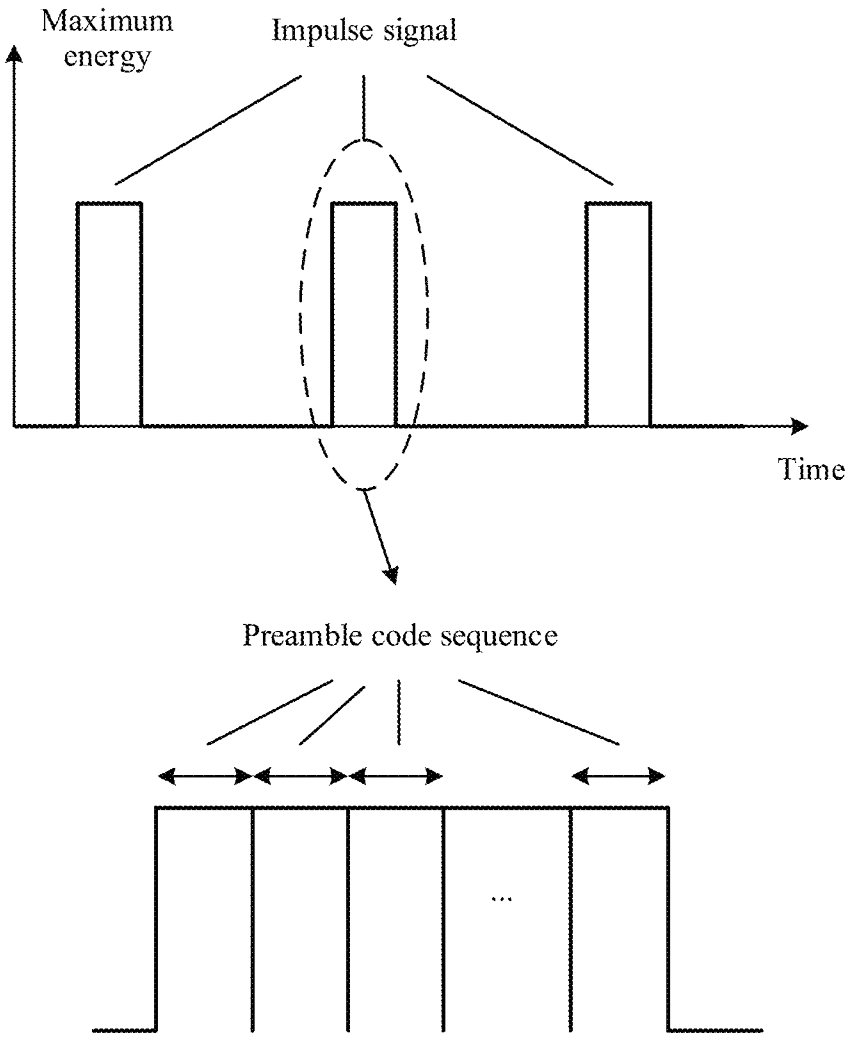
FIG. 1 is a diagram of an impulse signal.

To make objectives, technical solution, and advantages of embodiments of this application clearer, the following further describes embodiments of this application in detail with reference to the accompanying drawings. The terms “first” and “second” below in descriptions about embodiments of this application are merely used for a description purpose, and shall not be understood as an indication or implication of relative importance or implicit indication of a quantity of indicated technical features. Therefore, a feature limited by “first” or “second” may explicitly or implicitly include one or more features.

For ease of understanding, descriptions about concepts related to this application are provided as examples for reference.

IR-UWB is a wireless carrier communication technology that uses an ultra-wide baseband impulse signal with an extremely wide spectrum for communication. In the IR-UWB technology, nanosecond-level narrow impulses are used to transmit data, and occupy a wide frequency spectrum range. A signal usually has a bandwidth of hundreds of megahertz, to implement high precision positioning. Based on the IR-UWB technology, a receiver of a signal may estimate a location of a transmitter based on information such as transmit time of the signal, time of flight of the signal from the transmitter to the receiver, and an angle of arrival.

Device forms of the transmitter and the receiver provided in embodiments of this application may be communication apparatuses, functional modules or units disposed in communication apparatuses, chips or integrated circuits deployed in communication apparatuses, or the like.

The communication apparatus may be a device with an IR-UWB communication function. The communication apparatus may be a terminal device, user equipment (UE), a mobile terminal (MT), or the like. The communication apparatus includes but is not limited to a mobile phone, a tablet computer, a notebook computer, a palmtop computer, a mobile Internet device (MID), a wearable device (for example, a smartwatch or a smart band), a vehicle, a vehicle-mounted device (for example, a vehicle, an electric vehicle, an airplane, a ship, a train, or a high-speed rail vehicle), a virtual reality (VR) device, an augmented reality (AR) device, a wireless terminal in industrial control, a smart home device (for example, a refrigerator, a television, an air conditioner, or an electric meter), a smart robot, a workshop device, a wireless terminal in self-driving, a wireless terminal in remote medical surgery, a wireless terminal in a smart grid, a wireless terminal in transportation safety, a wireless terminal in a smart city, a wireless terminal in a smart home, a flight device (for example, a smart robot, a hot air balloon, an uncrewed aerial vehicle, or an airplane), or the like.

It should be understood that in embodiments of this application, "at least one" means one or more, and "a plurality of" means two or more. The term "and/or" describes an association relationship of associated objects, and indicates that three relationships may exist. For example, A and/or B may indicate the following three cases: Only A exists, both A and B exist, and only B exists. A and B may be singular or plural. The character "/" generally indicates an "or" relationship between the associated objects. "At least one of the following" or a similar expression thereof indicates any combination of these items, including a single item or any combination of a plurality of items. For example, at least one of a, b, or c may represent: a, b, c, a and b, a and c, b and c, or a, b and c, where a, b, and c may be a singular or plural number.

FIG. 1 is a diagram of an impulse signal. Currently, in a positioning process based on the IR-UWB technology, an impulse radio transmitter may send the impulse signal shown in FIG. 1 to an impulse radio receiver. Different impulse signals are separated by a long fixed period, and each impulse signal is usually in short nanosecond duration, in other words, the impulse signal is a short-time impulse signal. Each impulse signal may be represented by a symbol, namely, a preamble code. Specifically, as shown in FIG. 1, a sequence corresponding to each impulse signal may include at least one preamble code sequence, and the preamble code sequence is a spreading code sequence known to both the transmitter and the receiver. For example, the preamble code sequence may be the following sequence: {+1, 0, 0, +1, 0, −1, +1, −1}.

For ease of description, in the following embodiments of this application, the sequence corresponding to the impulse signal is referred to as an original impulse sequence.

Figure 2:
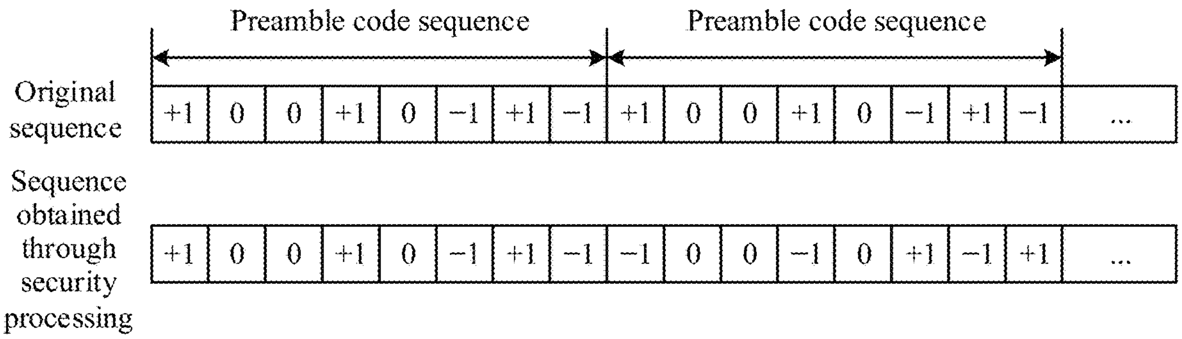
FIG. 2 is a diagram of a security processing method.

To improve security of impulse signal transmission, currently, the impulse radio transmitter may send an impulse signal corresponding to a processed sequence after performing security processing on a preamble code in the original impulse sequence. Currently, a commonly used security processing manner is adding another layer of security code (or referred to as a security code) to the preamble code in the original impulse sequence. For example, as shown in FIG. 2, when the preamble code sequence is {+1, 0, 0, +1, 0, −1, +1, −1}, and the security code is +1, a preamble code sequence obtained through security processing may be: the preamble code sequence*(+1)={+1, 0, 0, +1, 0, −1, +1, −1}. When the preamble code sequence is {+1, 0, 0, +1, 0, −1, +1, −1}, and the security code is −1, a preamble code sequence obtained through security processing may be: the preamble code sequence*(−1)={−1, 0, 0, −1, 0, +1, −1, +1}.

Figure 3:
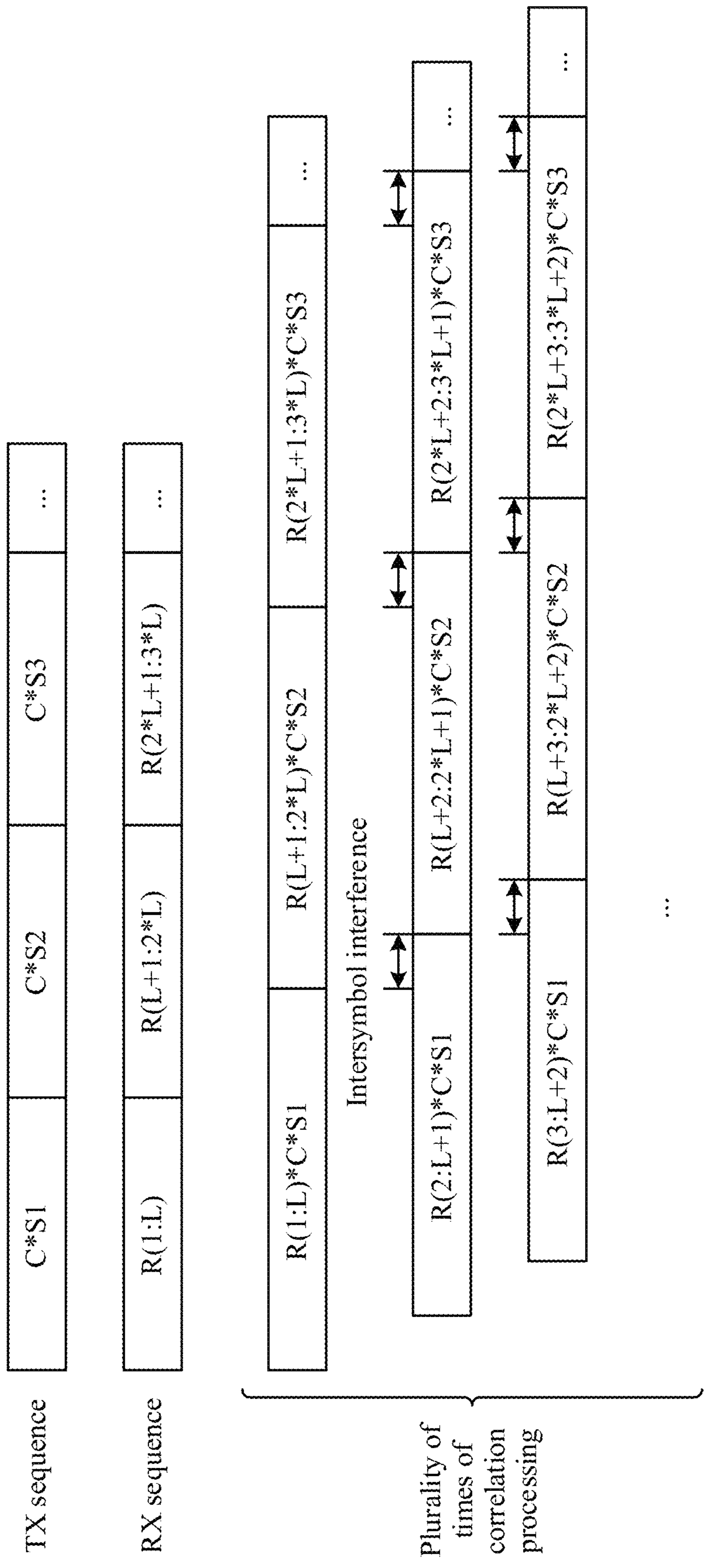
FIG. 3 is a diagram of a correlation processing method.

The impulse radio receiver may receive a signal from the impulse radio transmitter, perform correlation processing on a sequence corresponding to a signal received at each moment and a corresponding preamble code sequence on which security processing is performed, and determine, based on a correlation result, receiving time of the impulse signal, namely, time at which the impulse radio receiver receives the impulse signal. For example, as shown in FIG. 3, a preamble code sequence is a sequence C, a length of the preamble code sequence C is L, and a security code may be any one of S1, S2, and S3. A sequence that corresponds to an impulse signal on which security processing is performed and that is sent by the transmitter (TX), namely, the impulse radio transmitter, may be a TX sequence shown in FIG. 3, and a sequence corresponding to the signal received by the receiver (RX), namely, the impulse radio receiver, may be an RX sequence shown in FIG. 3. The receiver performs a plurality of correlation processing processes shown in FIG. 3 when receiving the RX sequence, and estimates receiving time of the impulse signal based on results of the plurality of correlation processing processes. In each correlation processing process, the receiver may divide a sequence received at the moment into at least one sequence whose length is L. The at least one sequence one-to-one corresponds to at least one preamble code sequence on which security processing is performed. The receiver may separately perform correlation calculation on each sequence and a corresponding preamble code sequence on which security processing is performed, and perform summation, to finally obtain a correlation result corresponding to the received sequence. For example, when a $1^{st}$ preamble code sequence C={+1, 0, 0, +1, 0, −1, +1, −1}, and a corresponding security code S1=+1, in a first correlation processing process, a $1^{st}$ sequence obtained by dividing a sequence corresponding to a signal received by the receiver is R(1:L)={R1, R2, R3, R4, R5, R6, R7, R8}, and a correlation processing result corresponding to the sequence may be: (R1*(+1)+R2*(0)+R3*(0)+R4*(+1)+R5*(0)+R6*(−1)+R7*(+1)+R8*(−1))*(+1). In a second correlation processing process, a $1^{st}$ sequence obtained by dividing a sequence of a signal received by the receiver is R(2:L+1)={R2, R3, R4, R5, R6, R7, R8, R9}, and a correlation processing result corresponding to the sequence may be: (R2*(+1)+R3*(0)+R4*(0)+R5*(+1)+R6*(0)+R7*(−1)+R8*(+1)+R9*(−1))*(+1). Another related processing process is similar, and examples are not enumerated herein.

In the foregoing solutions, security processing is performed on a preamble code via a security code. Although security of a transmission process is improved, interference exists between preamble codes on which security processing is performed, and consequently orthogonality of the preamble codes is reduced. For example, in an inter-symbol interference part shown in FIG. 3, a correlation calculation process overlaps from one preamble code to another preamble code.

Figure 4:
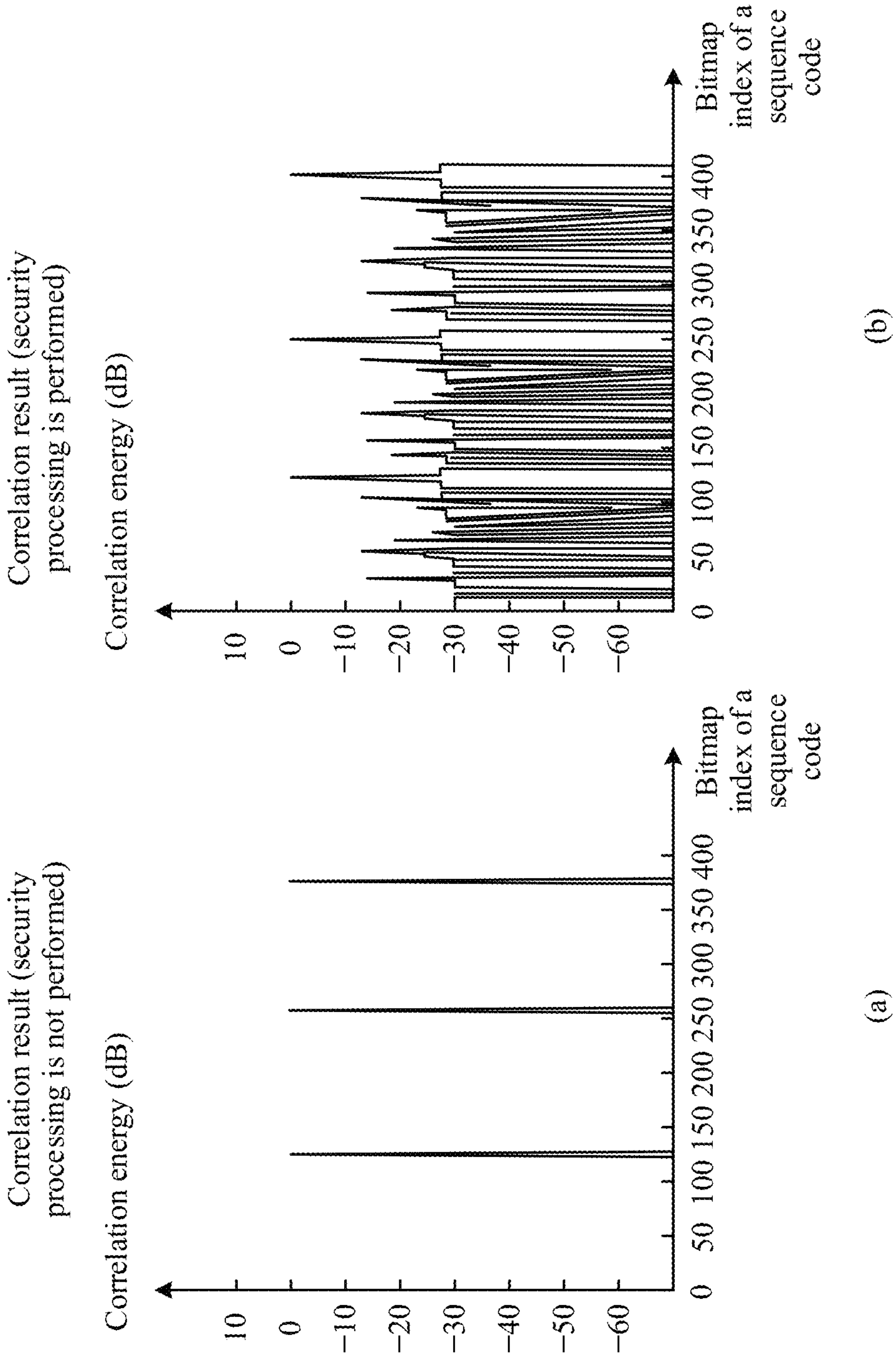
FIG. 4 is a diagram of comparison of correlation processing results.

FIG. 4 is a diagram of comparison of correlation processing results. A diagram (a) in FIG. 4 is a diagram of correlation results obtained when security processing is not performed on preamble codes, and a diagram (b) in FIG. 4 is a diagram of correlation results obtained when security processing is performed on preamble codes. It can be learned from comparison between the diagrams in FIG. 4 that a peak value and a non-peak value of correlation results can be obviously distinguished when security processing is not performed on the preamble codes, and a peak value and a non-peak value of correlation results are difficult to distinguish when security processing is performed on the preamble codes. Difficulty in distinguishing the peak value and the non-peak value causes an error in estimation of receiving time, and consequently an error occurs during ranging or positioning.

In view of the foregoing problems, embodiments of this application provide a signal sending method and a communication apparatus. The method is used to reduce interference between sequences in a sent signal, and improve orthogonality of the sequences. The method may be applied to an IR-UWB ranging or positioning process, to reduce interference between preamble codes in a signal sent by a transmitter, and improve orthogonality of the preamble codes. Improvement in the orthogonality of the preamble codes can improve accuracy of a result of correlation processing performed by a receiver, to further improve accuracy of time estimation performed by the receiver, and further improve accuracy of positioning.

The following describes the solutions provided in this application with reference to specific embodiments.

Figure 5:
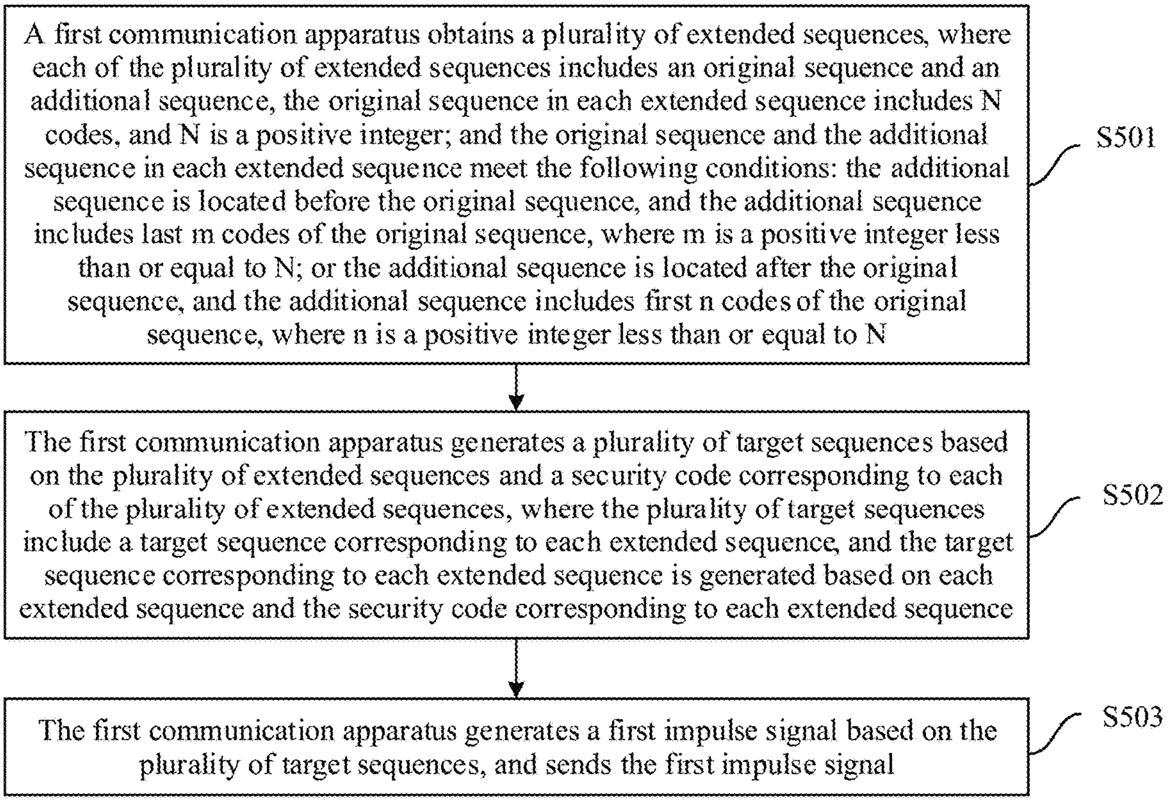
FIG. 5 is a diagram of a signal sending method according to some embodiments of this application.

FIG. 5 is a diagram of a signal sending method according to some embodiments of this application. As shown in FIG. 5, the method includes the following steps.

S501: A first communication apparatus obtains a plurality of extended sequences, where each of the plurality of extended sequences includes an original sequence and an additional sequence, the original sequence in each extended sequence includes N codes, and N is a positive integer; and the original sequence and the additional sequence in each extended sequence meet the following conditions: the additional sequence is located before the original sequence, and the additional sequence includes last m codes of the original sequence, where m is a positive integer less than or equal to N; or the additional sequence is located after the original sequence, and the additional sequence includes first n codes of the original sequence, where n is a positive integer less than or equal to N.

The first communication apparatus, serving as a transmitter device, may send a signal to another communication apparatus. The solutions provided in embodiments of this application may be applied to an IR-UWB ranging or positioning process. The signal sent by the first communication apparatus to another communication apparatus may be an impulse signal for ranging or positioning.

In embodiments of this application, a manner in which the first communication apparatus obtains the plurality of extended sequences may be generating the plurality of extended sequences based on a plurality of obtained original sequences, or may be obtaining the plurality of created extended sequences in another manner (for example, determining the plurality of extended sequences based on an indication of a user, or receiving the plurality of extended sequences from another communication apparatus).

The original sequence in embodiments of this application is a sequence including at least one code, and a value of each code may be −1, 0, or +1. The plurality of original sequences may be same sequences or different sequences. A length of each original sequence is a positive integer. For example, the length of the original sequence may range from 31 to 127. Optionally, the original sequence may be an orthogonal or near-orthogonal sequence. Optionally, lengths of the plurality of original sequences is the same (namely, a quantity of codes included in the sequence).

In some embodiments of this application, the plurality of original sequences may be preset sequences, or sequences agreed upon by both the first communication apparatus and another communication apparatus. This is not specifically limited in embodiments of this application.

In some embodiments of this application, the original sequence may be a spreading code sequence, the original sequence may be used as a preamble code sequence, and the extended sequence includes a corresponding original sequence and a cyclic prefix/cyclic suffix of the original sequence.

Figure 6A:
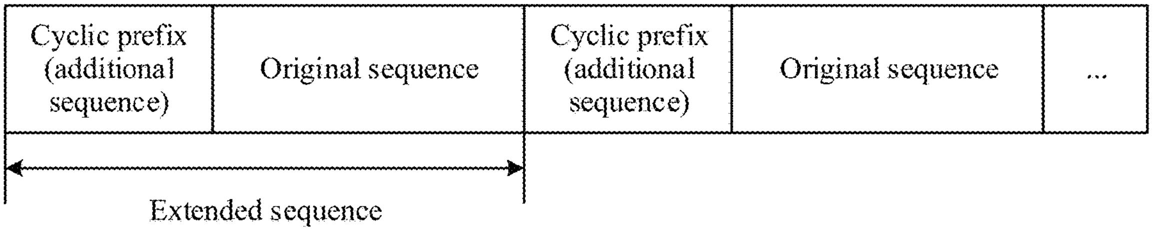
FIG. 6*a* is a composition diagram of an extended sequence according to some embodiments of this application.

For each extended sequence, in an optional implementation, each extended sequence may include a corresponding original sequence and an additional sequence corresponding to the original sequence. The original sequence includes N codes, where N is a positive integer. The additional sequence in each extended sequence is located before the original sequence, and the additional sequence includes the last m codes of the original sequence, where m is a positive integer less than or equal to N. The additional sequence is a cyclic prefix of the original sequence, in other words, each extended sequence may include a corresponding original sequence and a cyclic prefix of the original sequence, for example, a composition format of an extended sequence shown in FIG. 6*a*.

Figure 6B:
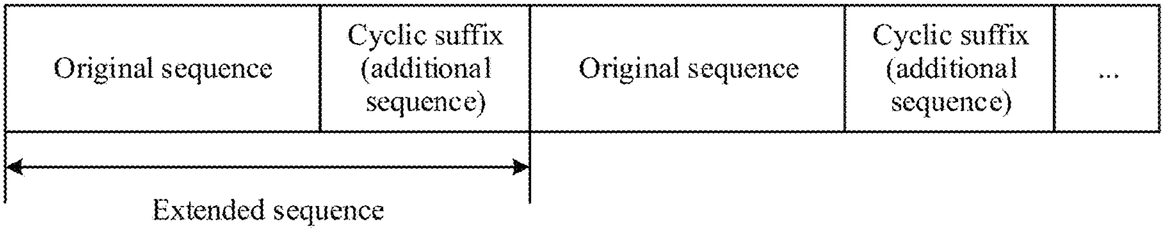
FIG. 6*b* is a composition diagram of an extended sequence according to some embodiments of this application.

In another optional implementation, each extended sequence may include a corresponding original sequence and an additional sequence corresponding to the original sequence. The original sequence includes N codes, where N is a positive integer. The additional sequence in each extended sequence is located after the original sequence, and the additional sequence includes the first n codes of the original sequence, where n is a positive integer less than or equal to N. The additional sequence is a cyclic suffix of the extended sequence, that is, each extended sequence may include a corresponding original sequence and a cyclic suffix of the original sequence, for example, a composition format of an extended sequence shown in FIG. 6*b*.

Figure 6C:
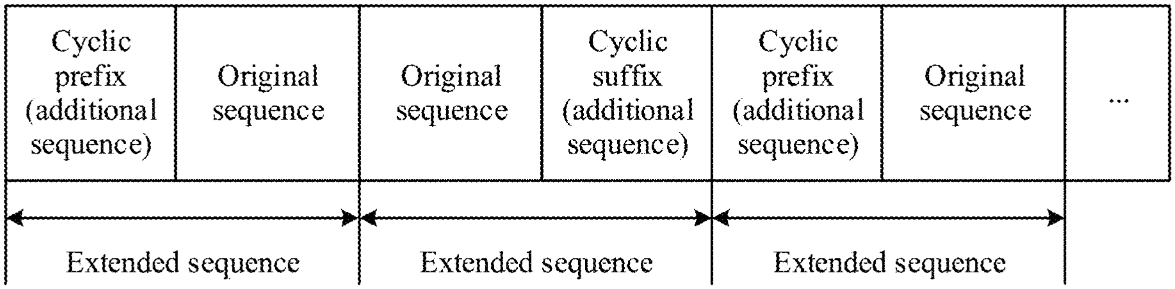
FIG. 6*c* is a composition diagram of an extended sequence according to some embodiments of this application.

In some embodiments of this application, composition manners and specific content of different extended sequences may be different. For example, as shown in FIG. 6*c*, some extended sequences include original sequences and cyclic prefixes of the original sequences, and some extended sequences include original sequences and cyclic suffixes of the original sequences.

In embodiments of this application, the additional sequence in each extended sequence may be obtained based on the original sequence in each extended sequence. When the additional sequence is a cyclic prefix of the original sequence, the additional sequence is last m codes of the original sequence, and a length of the cyclic prefix is m. When the additional sequence is a cyclic suffix of the original sequence, the additional sequence is first n codes of the original sequence, and a length of the cyclic suffix is n, where m and n are positive integers less than or equal to N, and values of m and n may be equal or unequal. Optionally, the values of m and n may be N/4, N/2, N, or the like, where N is the length of the original sequence. It is clear that the values of m and n may alternatively be other values, for example, random values or values manually set by the user.

Example 1: As shown in a diagram (a) in FIG. 7, any original sequence may be {+1, 0, 0, +1, 0, −1, +1, −1}, the sequence includes eight codes, and a value of each code is any one of −1, 0, and +1. When the additional sequence is a cyclic prefix of the original sequence, and a length of the additional sequence is 2, the additional sequence is {+1, −1}, and an extended sequence including the original sequence and the additional sequence is {+1, −1, +1, 0, 0, +1, 0, −1, +1, −1}. When the additional sequence is a cyclic prefix of the original sequence, and a length of the additional sequence is 8, the additional sequence is {+1, 0, 0, +1, 0, −1, +1, −1}, and an extended sequence including the original sequence and the additional sequence is {+1, 0, 0, +1, 0, −1, +1, −1, +1, 0, 0, +1, 0, −1, +1, −1}. When the additional sequence is a cyclic suffix of the original sequence, and a length of the additional sequence is 4, the additional sequence is {+1, 0, 0, +1}, and an extended sequence including the original sequence and the additional sequence is {+1, 0, 0, +1, 0, −1, +1, −1, +1, 0, 0, +1}.

The at least one extended sequence may form one sequence. The first communication apparatus may generate the plurality of extended sequences based on the plurality of original sequences in the foregoing manner, and combine the plurality of extended sequences, to obtain one sequence. The sequence obtained through combination may be used as a complete sequence used to generate one impulse signal.

S502: The first communication apparatus generates a plurality of target sequences based on the plurality of extended sequences and a security code corresponding to each of the plurality of extended sequences, where the plurality of target sequences include a target sequence corresponding to each extended sequence, and the target sequence corresponding to each extended sequence is generated based on each extended sequence and the security code corresponding to each extended sequence.

In some embodiments of this application, the security code corresponding to each extended sequence may be a preset value, may be pre-configured by a system of the first communication apparatus, or may be manually set by the user. This is not specifically limited in embodiments of this application. Optionally, the security code corresponding to each extended sequence may alternatively be a security code corresponding to the original sequence in the extended sequence. The security code corresponding to each original sequence may be a preset value, may be pre-configured by the system of the first communication apparatus, or may be manually set by the user. This is not specifically limited in embodiments of this application.

In the foregoing embodiments, after generating the plurality of extended sequences, the first communication apparatus may perform security processing on the extended sequence via the security code corresponding to each extended sequence, to obtain the plurality of target sequences corresponding to the plurality of extended sequences. In an optional implementation, for each original sequence, the first communication apparatus may select one security code from at least one set security code as the security code corresponding to the original sequence, use the security code corresponding to the original sequence as a security code corresponding to an extended sequence to which the original sequence belongs, and then perform security processing on the extended sequence via the security code. Alternatively, for each extended sequence, the first communication apparatus may select one security code from at least one set security code as the security code corresponding to the extended sequence, and perform security processing on the extended sequence via the security code corresponding to the extended sequence. In the foregoing manners, a corresponding target sequence may be obtained by performing security processing on each extended sequence. A value of the at least one security code includes at least one of the following: −1, 0, and +1. The first communication apparatus may randomly select, from the at least one security code, one security code corresponding to the original sequence and/or the extended sequence. When performing security processing on the extended sequence via the security code, the first communication apparatus may multiply each code in the extended sequence by the security code, to obtain the target sequence corresponding to the extended sequence.

Figure 7:
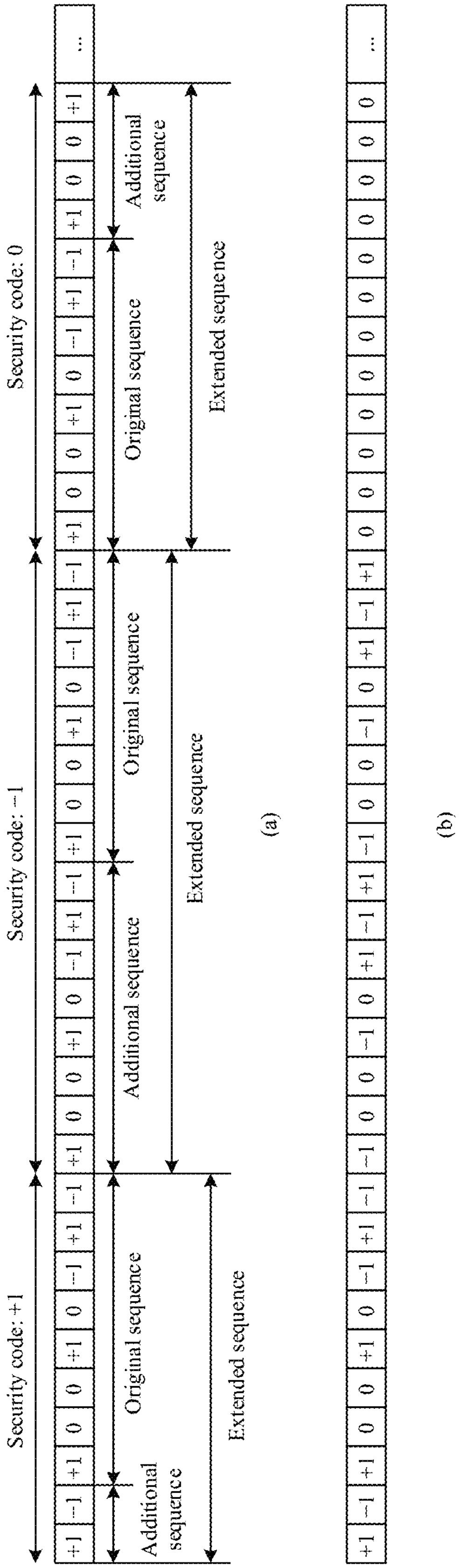
FIG. 7 is an example diagram of a security processing method according to some embodiments of this application.

Example 2: Based on the foregoing example 1, in instances where codes for performing security processing on each extended sequence in the diagram (a) in FIG. 7 are +1, −1, and 0, a sequence obtained by performing security processing on the sequence shown in the diagram (a) in FIG. 7 may be a sequence shown in the diagram (b) in FIG. 7: {+1, −1, +1, 0, 0, +1, 0, −1, +1, −1, −1, 0, 0, −1, 0, +1, −1,+1, −1, 0, 0, −1, 0, +1, −1, +1, 0, 0, 0, 0, 0, 0, 0, 0, 0, 0, 0}.

S503: The first communication apparatus generates a first impulse signal based on the plurality of target sequences, and sends the first impulse signal.

Information carried in the first impulse signal is a sequence including the plurality of target sequences.

In some embodiments of this application, the first communication apparatus may send the first impulse signal to a second communication apparatus. The first communication apparatus may further generate a plurality of impulse signals according to the method provided in the foregoing embodiments, and separately send the generated impulse signals to the second communication apparatus, so that the second communication apparatus can perform ranging or positioning and estimation based on the received signals.

In some embodiments of this application, the first communication apparatus may periodically send the impulse signals to the second communication apparatus.

Figure 8:
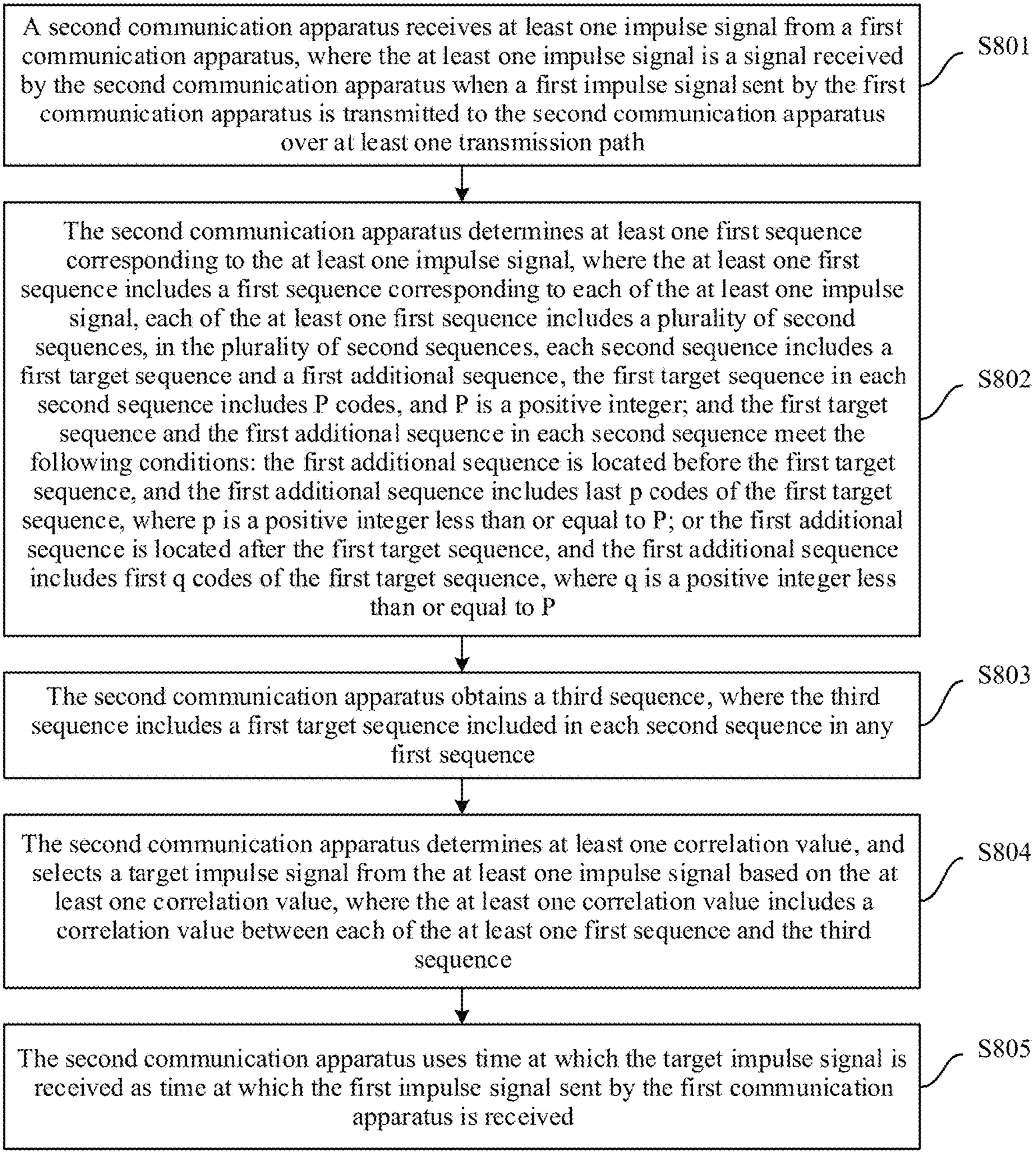
FIG. 8 is a diagram of a signal receiving method according to some embodiments of this application.

The foregoing method is a method performed by a transmitter. In some embodiments of this application, after the transmitter performs the foregoing method to generate the impulse signal and sends the impulse signal to a receiver, the receiver may continue to perform the following method to determine receiving time. After step S503, as shown in FIG. 8, the method may further include step S801 to step S805.

S801: A second communication apparatus receives at least one impulse signal from a first communication apparatus, where the at least one impulse signal is a signal received by the second communication apparatus when a first impulse signal sent by the first communication apparatus is transmitted to the second communication apparatus over at least one transmission path.

The second communication apparatus serves as a receiver, and may receive the signal from the first communication apparatus, and position the first communication apparatus or determine a distance between the first communication apparatus and the second communication apparatus based on the received signal.

In some embodiments of this application, the at least one impulse signal is the impulse signal received by the second communication apparatus, where the impulse signal is the first impulse signal that is sent by the first communication apparatus and that arrives at the second communication apparatus over the at least one transmission path. Different impulse signals pass through different transmission paths. Therefore, when arriving at the second communication apparatus, different impulse signals correspond to different phases and/or amplitude. Correspondingly, when arriving at the second communication apparatus, different impulse signals may correspond to different sequences.

For example, when a sequence corresponding to the first impulse signal sent by the first communication apparatus is {1, 1, 1, 1} and amplitude is 1, sequences corresponding to two signals that may be received by the second communication apparatus may be {0.7, 0.7, 0.7, 0.7} and {−1, −1, −1, −1} respectively. In comparison with the first impulse signal, amplitude of the $1^{st}$ signal decreases by 30%, and a phase of the $2^{nd}$ signal changes by 180°. It is clear that compared with the first impulse signal sent by the first communication apparatus, both the amplitude and the phase of the signal received by the second communication apparatus may change.

S802: The second communication apparatus determines at least one first sequence corresponding to the at least one impulse signal, where the at least one first sequence includes a first sequence corresponding to each of the at least one impulse signal, each of the at least one first sequence includes a plurality of second sequences, in the plurality of second sequences, each second sequence includes a first target sequence and a first additional sequence, the first target sequence in each second sequence includes P codes, and P is a positive integer; and the first target sequence and the first additional sequence in each second sequence meet the following conditions: the first additional sequence is located before the first target sequence, and the first additional sequence includes last p codes of the first target sequence, where p is a positive integer less than or equal to P; or the first additional sequence is located after the first target sequence, and the first additional sequence includes first q codes of the first target sequence, where q is a positive integer less than or equal to P.

In embodiments of this application, each first sequence determined by the second communication apparatus may include a plurality of subsequences (namely, the second sequences), and each subsequence may include one sequence and a cyclic prefix/cyclic suffix of the sequence.

In some embodiments of this application, the plurality of second sequences may be the plurality of target sequences in the foregoing embodiments. In this case, the first target sequence in each second sequence is a sequence obtained by performing security processing on an original sequence in an extended sequence corresponding to a target sequence corresponding to the second sequence, and the first additional sequence in each second sequence is a sequence obtained by performing security processing on an additional sequence in an extended sequence corresponding to a target sequence corresponding to the second sequence.

S803: The second communication apparatus obtains a third sequence, where the third sequence includes a first target sequence included in each second sequence in any first sequence.

In some embodiments of this application, the third sequence may be a set sequence or a sequence that is agreed upon by the second communication apparatus and the first communication apparatus and that is obtained by performing security processing on the plurality of original sequences in the foregoing embodiments. Alternatively, the third sequence may be a sequence obtained by performing security processing, by the second communication apparatus according to the method in the foregoing embodiments, on the plurality of original sequences via security codes corresponding to the plurality of original sequences. The plurality of original sequences, the plurality of security codes, and a correspondence between the plurality of original sequences and the plurality of security codes may be set, or may be agreed upon by the second communication apparatus and the first communication apparatus in advance.

For example, based on the scenario described in the example 1, the original sequence is {+1, 0, 0, +1, 0, −1, +1, −1}. When a length of the cyclic prefix is 2, and a security code for performing security processing on an extended sequence corresponding to the original sequence is −1, content in the third sequence corresponding to the original sequence is {−1, 0, 0, −1, 0, +1, −1, +1}. Based on the example 2, when the sequence corresponding to the first impulse signal sent by the first communication apparatus is the sequence shown in the diagram (b) in FIG. 7, the third sequence obtained by the second communication apparatus is {+1, 0, 0, +1, 0, −1, +1, −1, −1, 0, 0, −1, 0, +1, −1, +1, 0, 0, 0, 0, 0, 0, 0, 0}.

S804: The second communication apparatus determines at least one correlation value, and selects a target impulse signal from the at least one impulse signal based on the at least one correlation value, where the at least one correlation value includes a correlation value between each of the at least one first sequence and the third sequence.

Specifically, the second communication apparatus may separately perform, based on a sequence of time at which the at least one impulse signal is received, correlation calculation on the first sequence corresponding to each impulse signal and the third sequence, to obtain a correlation result (correlation value) corresponding to each first sequence. In this process, the second communication apparatus may use, as the target correlation result, a determined $1^{st}$ correlation result whose value is greater than a set threshold, and determine an impulse signal corresponding to a first sequence corresponding to a target correlation result as the target impulse signal.

Figure 9:
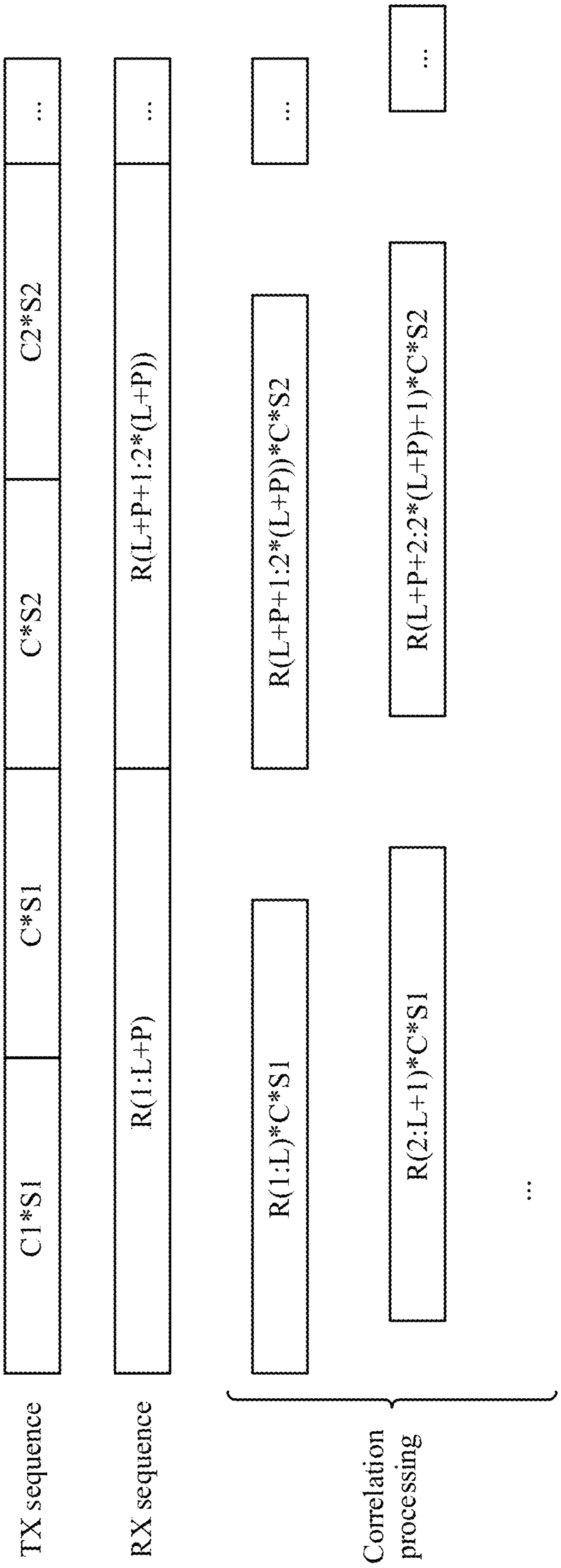
FIG. 9 is a diagram of a correlation processing method according to some embodiments of this application.

For example, as shown in FIG. 9, the sequence corresponding to the first impulse signal sent by the first communication apparatus to the second communication apparatus is a TX sequence. The TX sequence includes a plurality of target sequences, each target sequence is obtained by performing security processing on each of a plurality of extended sequences, and each extended sequence includes an original sequence (sequence C) and a cyclic prefix (for example, a sequence C1) or a cyclic suffix (for example, a sequence C2) of the original sequence. A length of the original sequence C is L, a length of the cyclic prefix or the cyclic suffix is P, and a security code may be either S1 or S2. The sequence corresponding to the impulse signal received by the second communication apparatus is denoted as an RX sequence. After receiving the at least one impulse signal, the second communication apparatus performs at least one correlation processing process shown in FIG. 9. In each correlation processing process, the second communication apparatus may perform correlation calculation on the first sequence corresponding to the impulse signal received at the moment and the third sequence, to obtain a corresponding correlation result. Specifically, the sequence corresponding to the impulse signal received by the second communication apparatus includes a plurality of subsequences whose length is L+P, and each of the plurality of subsequences corresponds to each original sequence that is in the third sequence and on which security processing is performed. A sum of correlation values of the plurality of subsequences and original sequences that are in corresponding third sequences and on which security processing is performed is the correlation value corresponding to the first sequence.

For example, when the original sequence C={+1, 0, 0, +1, 0, −1, +1, −1}, a corresponding cyclic prefix is {+1, −1}, and a corresponding security code S1=−1, a $1^{st}$ original sequence that is obtained through security processing and that corresponds to the TX sequence is {−1, 0, 0, −1, 0, +1, −1, +1}. In a first correlation processing process, a $1^{st}$ subsequence obtained by dividing a sequence of a signal received by the receiver is R(1:L+P)={R1, R2, R3, R4, R5, R6, R7, R8, R9, R10}, and a correlation processing result corresponding to the subsequence may be: (R1*(+1)+R2*(0)+R3*(0)+R4*(+1)+R5*(0)+R6*(−1)+R7*(+1)+R8*(−1))*(−1). In a second correlation processing process, a $1^{st}$ subsequence obtained by dividing a sequence of a signal received by the receiver is R(2:L+P+1)={R2, R3, R4, R5, R6, R7, R8, R9, R10, R11}, and a correlation processing result corresponding to the subsequence may be: (R2*(+1)+R3*(0)+R4*(0)+R5*(+1)+R6*(0)+R7*(−1)+R8*(+1)+R9*(−1))*(−1). Another related processing process is similar, and examples are not enumerated herein.

In the foregoing solutions, a cyclic prefix/cyclic suffix is added to the original sequence (which may be a preamble code), to eliminate impact caused by interference between original sequences in a correlation process on the receiver. Therefore, orthogonality of the original sequences can be improved. For example, as shown in FIG. 9, a correlation calculation process does not overlap from one original sequence to another original sequence.

S805: The second communication apparatus uses time at which the target impulse signal is received as time at which the first impulse signal sent by the first communication apparatus is received.

The target impulse signal determined based on the foregoing method is a signal that is received by the second communication apparatus, where the signal is an impulse signal that is sent by the first communication apparatus and that is propagated by air and transmitted in a straight line to the second communication apparatus. Therefore, the target impulse signal may be used to determine a distance between the first communication apparatus and the second communication apparatus.

Specifically, in an optional implementation, the second communication apparatus may obtain, from the first communication apparatus, the time at which the first communication apparatus sends the impulse signal, and use the time at which the second communication apparatus receives the target impulse signal as the time at which the impulse signal sent by the first communication apparatus is received, to determine transmission time (time of flight) of the impulse signal sent by the first communication apparatus between the first communication apparatus and the second communication apparatus. In combination with a propagation speed of a radio signal, the distance between the first communication apparatus and the second communication apparatus may be determined, and the first communication apparatus may be further located.

Figure 10:
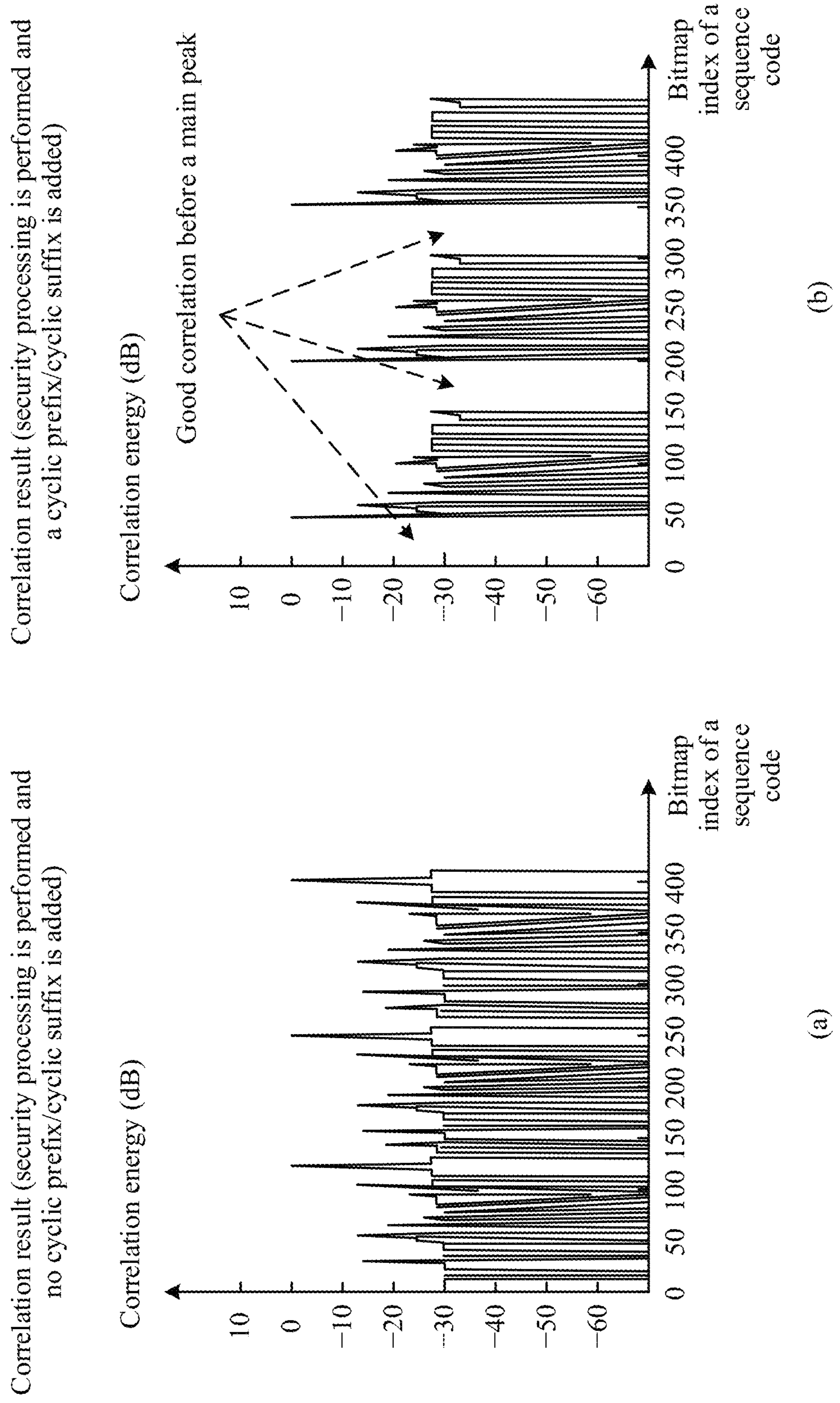
FIG. 10 is a diagram of comparison of correlation processing results according to some embodiments of this application.

FIG. 10 is a diagram of comparison of correlation processing results according to some embodiments of this application. The original sequence is a preamble code sequence. A diagram (a) in FIG. 10 is a diagram of correlation results obtained when security processing is performed on preamble codes and no cyclic prefix/cyclic suffix is added, and a diagram (b) in FIG. 10 is a diagram of correlation results obtained when security processing is performed on preamble codes and a cyclic prefix/cyclic suffix is added. It can be learned by comparing the diagrams in FIG. 10 that it is difficult to clearly distinguish a peak value and a non-peak value of a correlation result when no cyclic prefix/cyclic suffix is added, and a peak value and a non-peak value of a correlation result can be obviously distinguished when a cyclic prefix/cyclic suffix is added. Therefore, the solutions provided in this application can improve quality of identifying a peak value, to accurately select a target impulse signal, and improve accuracy of obtaining a corresponding timestamp. This further improves accuracy of estimating transmission time, and improve accuracy of ranging or positioning.

In the foregoing embodiments, the first communication apparatus, as the transmitter, adds a cyclic redundancy (cyclic prefix/cyclic suffix) to the original sequence before performing security processing on the original sequence, to reduce interference between the original sequences, improve orthogonality of the original sequences, and improve accuracy of a subsequent processing result. When the original sequence is a preamble code, the method may be applied to an IR-UWB ranging or positioning process, to improve orthogonality of preamble code, further improve accuracy of time estimation performed by the receiver, and improve accuracy of ranging or positioning.

Figure 11:
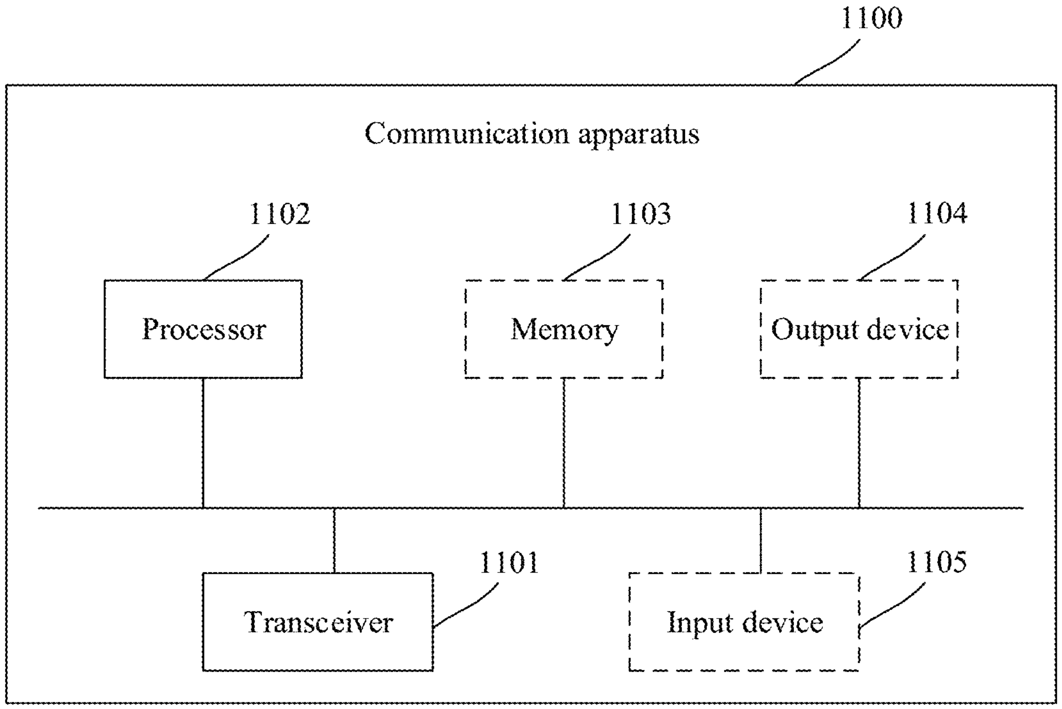
FIG. 11 is a diagram of a communication apparatus according to some embodiments of this application.

Based on the foregoing embodiments and a same concept, some embodiments of this application further provide a communication apparatus, configured to implement functions of the first communication apparatus or the second communication apparatus provided in embodiments of this application. FIG. 11 shows a communication apparatus 1100 according to some embodiments of this application. The communication apparatus 1100 may be a first communication apparatus, or may be a chip or a chip system in a first communication apparatus. Alternatively, the communication apparatus 1100 may be a second communication apparatus, or may be a chip or a chip system in a second communication apparatus.

Specifically, the communication apparatus 1100 includes a transceiver 1101 and at least one processor 1102. The processor 1102 is coupled to the transceiver 1101. In embodiments of this application, the coupling is indirect coupling or communication connection between apparatuses, units, or modules, may be in an electrical form, a mechanical form, or another form, and is used for information exchange between the apparatuses, units, or modules.

Specifically, the transceiver 1101 may be a circuit, a bus, a communication interface, or any other module that may be configured to perform information exchange, and may be configured to receive or send information.

Optionally, the communication apparatus 1100 may further include a memory 1103. The memory 1103 is coupled to the transceiver 1101 and the processor 1102, and is configured to store program instructions.

The processor 1102 is configured to invoke the program instructions stored in the memory 1103, so that the communication apparatus 1100 performs the method performed by the first communication apparatus or the second communication apparatus in the signal sending method provided in embodiments of this application.

The transceiver 1101 is configured to receive and send a radio frequency signal, and is coupled to a receiver and a transmitter of the communication apparatus 1100. The transceiver 1101 communicates with a communication network and another communication apparatus via a radio frequency signal, for example, a wireless local area network (WLAN), a Bluetooth communication network, and a UWB. During specific implementation, communication protocols supported by the transceiver 1101 at least include an IR-UWB protocol, and may further include protocols related to short-range wireless communication, for example, a Bluetooth protocol and a Wi-Fi protocol.

During specific implementation, the memory 1103 may include a high-speed random access memory, and may also include a non-volatile memory, for example, one or more magnetic disk storage devices, a flash memory device, or another non-volatile solid-state storage device. The memory 1103 may store an operating system (which is referred to as a system below), for example, an embedded operating system such as Android, iOS, Windows, or Linux. The memory 1103 may be configured to store an implementation program in embodiments of this application. The memory 1103 may further store a network communication program. The network communication program may be used to communicate with one or more additional devices, one or more pieces of user equipment, or one or more network devices.

The processor 1102 may be a general-purpose central processing unit (CPU), a microprocessor, an application-specific integrated circuit (ASIC), or one or more integrated circuits configured to control execution of programs of the solutions of this application.

In some embodiments, the communication apparatus 1100 may further include an output device 1104 and an input device 1105. The output device 1104 communicates with the processor 1102, and may display information in a plurality of manners. For example, the output device 1104 may be a liquid crystal display (LCD), a light-emitting diode (LED) display device, a cathode ray tube (CRT) display device, or a projector. The input device 1105 communicates with the processor 1102, and may receive an input from a user in a plurality of manners. For example, the input device 1105 may be a mouse, a keyboard, a touchscreen device, a sensor device, or the like. For ease of usage by the user of the output device 1104 and the input device 1105, in some embodiments, the memory 1103 may further store a user interface program. The user interface program may vividly display content of an application program through a graphical operating interface, and receive a control operation of the user on the application program by using an input control, for example, a menu, a dialog box, or a key.

It should be noted that FIG. 11 is merely an implementation of embodiments of this application. During actual application, the communication apparatus 1100 may further include more or fewer components. This is not limited herein.

For example, when the communication apparatus 1100 is used in the first communication apparatus in the foregoing embodiments, the processor 1102 is configured to: obtain a plurality of extended sequences, where each of the plurality of extended sequences includes an original sequence and an additional sequence, the original sequence in each extended sequence includes N codes, and N is a positive integer; and the original sequence and the additional sequence in each extended sequence meet the following conditions: the additional sequence is located before the original sequence, and the additional sequence includes last m codes of the original sequence, where m is a positive integer less than or equal to N; or the additional sequence is located after the original sequence, and the additional sequence includes first n codes of the original sequence, where n is a positive integer less than or equal to N; generate a plurality of target sequences based on the plurality of extended sequences and a security code corresponding to each of the plurality of extended sequences, where the plurality of target sequences include a target sequence corresponding to each extended sequence, and the target sequence corresponding to each extended sequence is generated based on each extended sequence and the security code corresponding to each extended sequence; and generate a first impulse signal based on the plurality of target sequences, and send the first impulse signal by using the transceiver 1101.

In a possible implementation, a value of m is equal to a value of N, or a value of m is a quarter of a value of N, or a value of m is a half of a value of N.

In a possible implementation, a value of n is equal to the value of N, or a value of n is a quarter of the value of N, or a value of n is a half of the value of N.

In a possible implementation, the plurality of extended sequences include a first extended sequence and a second extended sequence. The additional sequence in the first extended sequence is located before the original sequence in the first extended sequence, and the additional sequence in the second extended sequence is located before the original sequence in the second extended sequence; or the additional sequence in the first extended sequence is located after the original sequence in the first extended sequence, and the additional sequence in the second extended sequence is located before the original sequence in the second extended sequence; or the additional sequence in the first extended sequence is located before the original sequence in the first extended sequence, and the additional sequence in the second extended sequence is located after the original sequence in the second extended sequence.

In a possible implementation, a value of each code in the original sequence in each extended sequence is any one of the following values: −1, 0, and +1.

In a possible implementation, a value of the security code corresponding to each extended sequence is any one of the following values: −1, 0, and +1.

In a possible implementation, when generating the plurality of target sequences based on the plurality of extended sequences and the security code corresponding to each of the plurality of extended sequences, the processor 1102 is specifically configured to multiply a code included in each extended sequence by a corresponding security code, to obtain the target sequence corresponding to each extended sequence.

For example, when the communication apparatus 1100 is used in the second communication apparatus in the foregoing embodiments, the transceiver 1101 is configured to receive at least one impulse signal from a first communication apparatus, where the at least one impulse signal is a signal received by the second communication apparatus when a first impulse signal sent by the first communication apparatus is transmitted to the second communication apparatus over at least one transmission path. The processor 1102 is configured to: determine at least one first sequence corresponding to the at least one impulse signal, where the at least one first sequence includes a first sequence corresponding to each of the at least one impulse signal, each of the at least one first sequence includes a plurality of second sequences, in the plurality of second sequences, each second sequence includes a first target sequence and a first additional sequence, the first target sequence in each second sequence includes P codes, and P is a positive integer; and the first target sequence and the first additional sequence in each second sequence meet the following conditions: the first additional sequence is located before the first target sequence, and the first additional sequence includes last p codes of the first target sequence, where p is a positive integer less than or equal to P; or the first additional sequence is located after the first target sequence, and the first additional sequence includes first q codes of the first target sequence, where q is a positive integer less than or equal to P; obtain a third sequence, where the third sequence includes the first target sequence included in each second sequence in any first sequence; determine at least one correlation value, and select a target impulse signal from the at least one impulse signal based on the at least one correlation value, where the at least one correlation value includes a correlation value between each of the at least one first sequence and the third sequence; and use time at which the target impulse signal is received as time at which the first impulse signal sent by the first communication apparatus is received.

In a possible implementation, the plurality of second sequences are generated based on a plurality of extended sequences and a security code corresponding to each of the plurality of extended sequences. The plurality of second sequences include a second sequence corresponding to each of the plurality of extended sequences, and the second sequence corresponding to each extended sequence is generated based on each extended sequence and the security code corresponding to each extended sequence. In the plurality of extended sequences, each extended sequence includes an original sequence and an additional sequence, the original sequence in each extended sequence includes N codes, and N is a positive integer. The original sequence and the additional sequence in each extended sequence meet the following conditions: the additional sequence is located before the original sequence, and the additional sequence includes last m codes of the original sequence, where m is a positive integer less than or equal to N; or the additional sequence is located after the original sequence, and the additional sequence includes first n codes of the original sequence, where n is a positive integer less than or equal to N.

In a possible implementation, a quantity of codes of the original sequence included in the extended sequence corresponding to each second sequence is equal to a quantity of codes of a first target sequence included in the second sequence. A quantity of codes of the additional sequence included in the extended sequence corresponding to each second sequence is equal to a quantity of codes of a first additional sequence included in the second sequence.

In a possible implementation, a value of m is equal to a value of N, or a value of m is a quarter of a value of N, or a value of m is a half of a value of N.

In a possible implementation, a value of n is equal to the value of N, or a value of n is a quarter of the value of N, or a value of n is a half of the value of N.

In a possible implementation, in the plurality of extended sequences, a value of each code in the original sequence included in each extended sequence is any one of the following values: −1, 0, and +1.

In a possible implementation, a value of the security code corresponding to each of the plurality of extended sequences is any one of the following values: −1, 0, and +1.

In a possible implementation, a value of p is equal to a value of P, or a value of p is a quarter of the value of N, or a value of p is a half of a value of P.

In a possible implementation, a value of q is equal to the value of P, or a value of q is a quarter of the value of N, or a value of q is a half of the value of P.

In a possible implementation, in the plurality of second sequences, a value of each code in the first target sequence included in each second sequence is any one of the following values: −1, 0, and +1.

Figure 12:
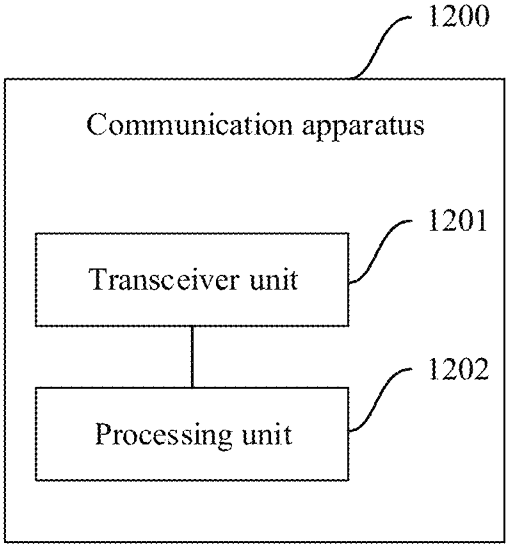
FIG. 12 is a diagram of a structure of a communication apparatus according to some embodiments of this application.

Based on the foregoing embodiments and a same concept, some embodiments of this application further provides a communication apparatus, configured to implement functions of the first communication apparatus or the second communication apparatus provided in embodiments of this application. FIG. 12 shows a communication apparatus 1200 according to some embodiments of this application. The communication apparatus 1200 may be a terminal device, or a chip or a chip system in a terminal device.

Specifically, the communication apparatus 1200 includes a transceiver unit 1201 and a processing unit 1202. The transceiver unit 1201 is configured to: receive a signal from another communication apparatus other than the communication apparatus 1200 and transmit the signal to the processing unit 1202, or send a signal from the processing unit 1202 to another communication apparatus other than the communication apparatus 1200.

When the communication apparatus 1200 is used in the first communication apparatus in the foregoing embodiments, the transceiver unit 1201 cooperates with the processing unit 1202, and may be configured to perform the method, provided in embodiments of this application, performed by the first communication apparatus.

When the communication apparatus 1200 is used in the second communication apparatus in the foregoing embodiments, the transceiver unit 1201 cooperates with the processing unit 1202, and may be configured to perform the method, provided in embodiments of this application, performed by the second communication apparatus.

Division into modules in embodiments of this application is an example, is merely logical function division, and may be another division manner during actual implementation. In addition, functional modules in embodiments of this application may be integrated into one processor, or may exist alone physically, or two or more modules are integrated into one module. The integrated module may be implemented in a form of hardware, or may be implemented in a form of a software functional module.

Based on the foregoing embodiments and a same concept, some embodiments of this application further provides a communication system. The communication system at least includes the first communication apparatus and the second communication apparatus provided in the foregoing embodiments.

Based on the foregoing embodiments and a same concept, some embodiments of this application further provides a computer-readable storage medium. The computer-readable storage medium stores a computer-readable program, and when the computer-readable program is run on a computer, the computer is enabled to perform the method, provided in the foregoing embodiments, applied to the first communication apparatus or the second communication apparatus.

Based on the foregoing embodiments and a same concept, some embodiments of this application further provides a computer program product. When the computer program product runs on a computer, the computer is enabled to perform the method, provided in the foregoing embodiments, applied to the first communication apparatus or the second communication apparatus.

Based on the foregoing embodiments and a same concept, some embodiments of this application further provides a chip. The chip is configured to read a computer program stored in a memory, to perform the method, provided in the foregoing embodiments, applied to the first communication apparatus or the second communication apparatus.

Based on the foregoing embodiments and a same concept, some embodiments of this application further provides a chip system. The chip system includes a processor, configured to support a communication apparatus in implementing the method, provided in the foregoing embodiments, applied to the first communication apparatus or the second communication apparatus.

In a possible implementation, the chip system further includes a memory, and the memory is configured to store a program and data that are necessary for the computer apparatus.

In a possible implementation, the chip system includes a chip, or includes a chip and another discrete component.

All or some of the methods in embodiments of this application may be implemented by using software, hardware, firmware, or any combination thereof. When software is used to implement the methods, all or a part of the methods may be implemented in a form of a computer program product. The computer program product includes one or more computer instructions. When the computer program instructions are loaded and executed on the computer, the procedure or functions according to embodiments of the present disclosure are all or partially generated. The computer may be a general-purpose computer, a special-purpose computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

It is clear that a person skilled in the art can make various modifications and variations to this application without departing from the scope of this application. This application is intended to cover these modifications and variations of this application provided that they fall within the scope of protection defined by the following claims and their equivalent technologies.

The invention claimed is:

1. A signal sending method comprising:

obtaining a plurality of extended sequences, wherein each extended sequence in the plurality of extended sequences comprises an original sequence and an additional sequence, the original sequence in each extended sequence comprises N codes, where N is a positive integer, and wherein in each extended sequence, when the additional sequence is located before the original sequence, the additional sequence comprises last m codes of the original sequence, m being a positive integer less than or equal to N, and when the additional sequence is located after the original sequence, the additional sequence comprises first n codes of the original sequence, n being a positive integer less than or equal to N;

generating a plurality of target sequences based on the plurality of extended sequences and a security code corresponding to each extended sequence in the plurality of extended sequences, wherein the plurality of target sequences comprises a target sequence corresponding to each extended sequence, and the target sequence corresponding to each extended sequence is generated based on each extended sequence and the security code corresponding to each extended sequence; and generating a first impulse signal based on the plurality of target sequences; and sending the first impulse signal.

2. The method according to claim 1, wherein m is equal to N, a quarter of N, or a half of N.

3. The method according to claim 1, wherein n is equal to N, a quarter of N, or a half of N.

4. The method according to claim 1, wherein the plurality of extended sequences comprises a first extended sequence and a second extended sequence, wherein the additional sequence in the first extended sequence is located before the original sequence in the first extended sequence, and the additional sequence in the second extended sequence is located before the original sequence in the second extended sequence.

5. The method according to claim 1, wherein the plurality of extended sequences comprises a first extended sequence and a second extended sequence, wherein the additional sequence in the first extended sequence is located after the original sequence in the first extended sequence, and the additional sequence in the second extended sequence is located before the original sequence in the second extended sequence.

6. The method according to claim 1, wherein the plurality of extended sequences comprises a first extended sequence and a second extended sequence, wherein the additional sequence in the first extended sequence is located before the original sequence in the first extended sequence, and the additional sequence in the second extended sequence is located after the original sequence in the second extended sequence.

7. The method according to claim 1, wherein a value of each code in the original sequence in each extended sequence is −1, 0, or +1.

8. The method according to claim 1, wherein a value of the security code corresponding to each extended sequence is −1, 0, or +1.

9. The method according to claim 1, wherein the step of generating the plurality of target sequences comprises:

multiplying a code comprised in each extended sequence in the plurality of extended sequences by a corresponding security code, to obtain the target sequence corresponding to said each extended sequence.

10. A communication apparatus comprising:

a transceiver;

a memory storing executable instructions; and a processor configured to execute the executable instructions to perform operations of:

obtaining a plurality of extended sequences, wherein each extended sequence in the plurality of extended sequences comprises an original sequence and an additional sequence, the original sequence in each extended sequence comprises N codes, where N is a positive integer, and wherein in each extended sequence, when the additional sequence is located before the original sequence, the additional sequence comprises last m codes of the original sequence, m being a positive integer less than or equal to N, and when the additional sequence is located after the original sequence, the additional sequence comprises first n codes of the original sequence, n being less than or equal to N;

generating a plurality of target sequences based on the plurality of extended sequences and a security code corresponding to each extended sequence in the plurality of extended sequences, wherein the plurality of target sequences comprises a target sequence corresponding to each extended sequence, and the target sequence corresponding to each extended sequence is generated based on each extended sequence and the security code corresponding to each extended sequence; and generating a first impulse signal based on the plurality of target sequences; and sending the first impulse signal by using the transceiver.

11. The communication apparatus according to claim 10, wherein m is equal to N, a quarter of N, or a half of N.

12. The communication apparatus according to claim 10, wherein n is equal to N, a quarter of N, or a half of N.

13. The communication apparatus according to claim 10, wherein the plurality of extended sequences comprises a first extended sequence and a second extended sequence, wherein the additional sequence in the first extended sequence is located before the original sequence in the first extended sequence, and the additional sequence in the second extended sequence is located before the original sequence in the second extended sequence.

14. The communication apparatus according to claim 10, wherein the plurality of extended sequences comprises a first extended sequence and a second extended sequence, wherein the additional sequence in the first extended sequence is located after the original sequence in the first extended sequence, and the additional sequence in the second extended sequence is located before the original sequence in the second extended sequence.

15. The communication apparatus according to claim 10, wherein the plurality of extended sequences comprises a first extended sequence and a second extended sequence, wherein the additional sequence in the first extended sequence is located before the original sequence in the first extended sequence, and the additional sequence in the second extended sequence is located after the original sequence in the second extended sequence.

16. The communication apparatus according to claim 10, wherein a value of each code in the original sequence in each extended sequence is −1, 0, or +1.

17. The communication apparatus according to claim 10, wherein a value of the security code corresponding to each extended sequence is −1, 0, or +1.

18. The communication apparatus according to claim 10, wherein the operation of generating the plurality of target sequences comprise:

multiplying a code comprised in each extended sequence in the plurality of extended sequences by a corresponding security code, to obtain the target sequence corresponding to said each extended sequence.

19. A non-transitory computer-readable storage medium having stored thereon executable instructions that, when executed by a processor of an apparatus, cause the apparatus to perform operations of:

obtaining a plurality of extended sequences, wherein each extended sequence in the plurality of extended sequences comprises an original sequence and an additional sequence, the original sequence in each extended sequence comprises N codes, where N is a positive integer, and wherein in each extended sequence, when the additional sequence is located before the original sequence, the additional sequence comprises last m codes of the original sequence, m being a positive integer less than or equal to N, and when the additional sequence is located after the original sequence, the additional sequence comprises first n codes of the original sequence, n being a positive integer less than or equal to N;

generating a plurality of target sequences based on the plurality of extended sequences and a security code corresponding to each of the plurality of extended sequences, wherein the plurality of target sequences comprises a target sequence corresponding to each extended sequence, and the target sequence corresponding to each extended sequence is generated based on each extended sequence and the security code corresponding to each extended sequence; and generating a first impulse signal based on the plurality of target sequences, and sending the first impulse signal.

20. The non-transitory computer-readable medium according to claim 19, wherein the operation of generating the plurality of target sequences comprise:

multiplying a code comprised in each extended sequence by a corresponding security code, to obtain the target sequence corresponding to each extended sequence.

* * * * *